(12) United States Patent
Shelby et al.

(10) Patent No.: US 12,324,047 B2
(45) Date of Patent: *Jun. 3, 2025

(54) SHARED SPECTRUM ACCESS FOR BROADCAST AND BI-DIRECTIONAL, PACKET-SWITCHED COMMUNICATIONS

(71) Applicant: Coherent Logix, Incorporated, Austin, TX (US)

(72) Inventors: Kevin A. Shelby, Austin, TX (US); Durga P. Prasad, Austin, TX (US); Sandeep Mavuduru Kannappa, Austin, TX (US); Mark Earnshaw, Kanata (CA)

(73) Assignee: HyperX Holdings LLC, Austin, TX (US)

( * ) Notice: Subject to any disclaimer, the term of this patent is extended or adjusted under 35 U.S.C. 154(b) by 608 days.

This patent is subject to a terminal disclaimer.

(21) Appl. No.: 17/555,769

(22) Filed: Dec. 20, 2021

(65) Prior Publication Data

US 2022/0117030 A1    Apr. 14, 2022

Related U.S. Application Data

(63) Continuation of application No. 16/186,768, filed on Nov. 12, 2018, now Pat. No. 11,234,288, which is a
(Continued)

(51) Int. Cl.
*H04W 76/28* (2018.01)
*H04W 16/14* (2009.01)
(Continued)

(52) U.S. Cl.
CPC .......... *H04W 76/28* (2018.02); *H04W 16/14* (2013.01); *H04W 72/044* (2013.01); *H04W 72/30* (2023.01)

(58) Field of Classification Search
None
See application file for complete search history.

(56) References Cited

U.S. PATENT DOCUMENTS

| 8,867,501 B2 | 10/2014 | Wang |
| 2002/0007490 A1 | 1/2002 | Jeffery |

(Continued)

FOREIGN PATENT DOCUMENTS

| CN | 1647394 A | 7/2005 |
| CN | 101098500 A | 1/2008 |

(Continued)

OTHER PUBLICATIONS

International Search Report for Application No. PCT/US2015/044524, mailed Oct. 30, 2015 (4 pages).
(Continued)

*Primary Examiner* — Jamaal Henson
(74) *Attorney, Agent, or Firm* — Kowert, Hood, Munyon, Rankin & Goetzel, P.C.; Jeffrey C. Hood; Luke Langsjoen

(57) ABSTRACT

Techniques are disclosed relating to spectrum sharing between different radio access technologies. In some embodiments, a broadcast base station is configured to wirelessly broadcast audio and video data to a plurality of broadcast receiver devices using a particular frequency band. In these embodiments, the broadcast base station is configured to discontinue broadcasting in the particular frequency band during a scheduled time interval, to enable one or more cellular base stations to perform cellular packet-switched wireless data communications using the particular frequency band.

20 Claims, 13 Drawing Sheets

Related U.S. Application Data continuation-in-part of application No. 14/822,603, filed on Aug. 10, 2015, now Pat. No. 10,129,601.

(60) Provisional application No. 62/041,534, filed on Aug. 25, 2014.

(51) Int. Cl.
*H04W 72/044* (2023.01)
*H04W 72/30* (2023.01)

(56) References Cited

U.S. PATENT DOCUMENTS

| | | |
|---|---|---|
| 2008/0046949 A1* | 2/2008 | Liu .................. H04H 20/71 725/120 |
| 2008/0076443 A1 | 3/2008 | Guo |
| 2008/0122651 A1 | 5/2008 | Niederfeld et al. |
| 2008/0125131 A1* | 5/2008 | Guo .................. H04H 60/91 455/446 |
| 2008/0221951 A1 | 9/2008 | Stanforth |
| 2009/0013363 A1 | 1/2009 | Lee |
| 2009/0046617 A1 | 2/2009 | Tenny et al. |
| 2009/0077383 A1 | 3/2009 | de Monseignat et al. |
| 2010/0009687 A1 | 1/2010 | Koivisto et al. |
| 2010/0056131 A1 | 3/2010 | Kelif |
| 2010/0056136 A1 | 3/2010 | Zhu |
| 2010/0272004 A1 | 10/2010 | Maeda et al. |
| 2010/0293428 A1* | 11/2010 | Luo .................. H04B 7/2656 714/E11.131 |
| 2010/0323683 A1 | 12/2010 | Kazmi et al. |
| 2011/0063879 A1 | 3/2011 | Murata |
| 2011/0263252 A1 | 10/2011 | Saini et al. |
| 2012/0076064 A1 | 3/2012 | Ma et al. |
| 2012/0086512 A1 | 4/2012 | Sharma et al. |
| 2012/0178467 A1 | 7/2012 | Fuji et al. |
| 2012/0327913 A1 | 12/2012 | Wang et al. |
| 2013/0072106 A1 | 3/2013 | Koskela |
| 2013/0208587 A1 | 8/2013 | Bala |
| 2013/0310059 A1 | 11/2013 | Parkvall et al. |
| 2013/0322279 A1 | 12/2013 | Chincholi |
| 2013/0336433 A1 | 12/2013 | Takahashi |
| 2014/0064216 A1 | 3/2014 | Agiwal et al. |
| 2014/0071961 A1 | 3/2014 | Nigam |
| 2014/0073335 A1 | 3/2014 | Panchal |
| 2014/0078922 A1 | 3/2014 | Xing |
| 2014/0120940 A1 | 5/2014 | Ren |
| 2014/0328192 A1 | 11/2014 | Barriac |
| 2015/0043491 A1* | 2/2015 | Eng .................. H04W 4/06 370/329 |
| 2015/0110012 A1 | 4/2015 | Bhushan et al. |
| 2016/0057504 A1 | 2/2016 | Shelby et al. |
| 2016/0212626 A1 | 7/2016 | Simon et al. |
| 2017/0257838 A1 | 9/2017 | Patel et al. |

FOREIGN PATENT DOCUMENTS

| | | |
|---|---|---|
| CN | 101155007 A | 4/2008 |
| CN | 101098500 B | 5/2010 |
| CN | 102845116 A | 12/2012 |
| CN | 103703853 A | 4/2014 |
| CN | 101925004 B | 12/2016 |
| JP | 2005522931 A | 7/2005 |
| JP | 2008-17474 | 1/2008 |
| JP | 2008-79312 | 4/2008 |
| JP | 2012-530415 | 11/2012 |
| JP | 2014510479 A | 4/2014 |
| WO | 2003088510 A1 | 10/2003 |
| WO | WO 03/088510 A1 | 10/2003 |
| WO | 2013116662 A1 | 8/2013 |
| WO | 2013153884 A1 | 10/2013 |

OTHER PUBLICATIONS

Advanced Television Systems Committee, "ATSC Standard: A/321, System Discovery and Signaling", Doc. A/321:2016, Mar. 23, 2016, 28 pages.
Advanced Television Systems Committee, "ATSC Standard: Physical Layer Protocol", Doc. A/322:2017, Jun. 6, 2017, 262 pages.
3GPP TS 36.211, "EUTRA: Physical channels and modulation", V15.3.0 (Sep. 2018), Sep. 2018, 237 pages.
3GPP TS 36.321, "EUTRA: Medium Access Control (MAC) protocol specification", V15.3.0 (Sep. 2018), Sep. 2018, 127 pages.
3GPP TS 36.300, "EUTRA: Overall description", V15.3.0 (Sep. 2018), Sep. 2018, 328 pages.
3GPP TS 36.331, "EUTRA: Radio Resource Control (RRC) protocol specification", V15.3.0 (Sep. 2018), Sep. 2018, 918 pages.
3GPP TS 38.300, "NR and NG-RAN Overall Description", V15.3.1 (Oct. 2018), Oct. 2018, 92 pages.
International Search Report and Written Opinion for International Application No. PCTIUS2019/057617, date mailed Mar. 2, 2020, 10 pgs.
Office Action for Taiwanese Application No. 108139389, dated Aug. 10, 2020, 12 pgs.
Extended European Search Report for European Application. No. 20206616.3, dated Nov. 20, 2027, 8 pgs.
First Office Action issued by China National Intellectual Property Administration on Sep. 2, 2019 in Chinese Application for Invention No. 201580045562.0, 21 pp.
Communication pursuant to Article 94(3) EPC, European Application No. 15753570.9, mailed Nov. 23, 2018 8 pages.

* cited by examiner

SHARED SPECTRUM ACCESS FOR BROADCAST AND BI-DIRECTIONAL, PACKET-SWITCHED COMMUNICATIONS

PRIORITY CLAIM

This application is a continuation of U.S. patent application Ser. No. 16/186,768 filed Nov. 12, 2018, which is a continuation-in-part of U.S. patent application Ser. No. 14/822,603 titled "Shared Spectrum Access for Broadcast and Bi-Directional, Packet-Switched Communications" and filed Aug. 10, 2015, now U.S. Pat. No. 10,129,601, which claims the benefit of priority to U.S. Provisional Application Ser. No. 62/041,534 filed Aug. 25, 2014, the disclosures of each of which are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to dynamic spectrum sharing for wireless communications.

DESCRIPTION OF THE RELATED ART

Wireless communication systems are rapidly growing in usage. Further, wireless communication technology has evolved from voice-only communications to also include the transmission of data, such as Internet and multimedia content. The proliferation of wireless communications may lead to a scarcity of frequency spectrum. Further, utilization of different portions of the spectrum may vary. For example, during some intervals cellular communications in a particular frequency band may be high. At the same time, broadcast television (TV) providers may not be utilizing all of their allotted frequency resources.

Thus, in some embodiments, techniques for dynamic spectrum sharing between different radio technologies may be desired.

SUMMARY

Techniques are disclosed relating to dynamic spectrum sharing. In some embodiments, a broadcast base station is configured to wirelessly broadcast audio and video data to multiple broadcast receiver devices using a particular frequency band. In these embodiments, the broadcast base station is configured to discontinue broadcasting in the particular frequency band during a scheduled time interval, to enable one or more cellular base stations to perform bi-directional packet-switched wireless data communications using the particular frequency band.

In some embodiments, a base station (e.g., a Long Term Evolution (LTE) base station) is configured to perform bi-directional packet-switched communication with one or more mobile devices using a first frequency band. In these embodiments, the base station is also configured to perform bi-directional packet-switched communication with one or more mobile devices using a second frequency band during a scheduled time interval, wherein the second frequency band is used for wirelessly broadcasting audio and video data to multiple devices during one or more time intervals other than the scheduled time interval.

In some embodiments, the disclosed techniques may allow for dynamic spectrum sharing between cellular and broadcast communications. In some embodiments, a single base station is configured as both a broadcast base station and a cellular base station.

In some embodiments, mobile devices are configured to switch between frequency bands in order to take advantage of shared spectrum. In various embodiments, mobile devices may be configured to power down during blanking intervals for a corresponding radio technology (during which communications in the same spectrum by another radio technology may occur). In various embodiments, control signaling transmitted by cellular base stations and/or broadcast base stations may enable wireless receiver devices to maintain connectivity during dynamic spectrum sharing.

DETAILED DESCRIPTION

Acronyms

Figure 2:
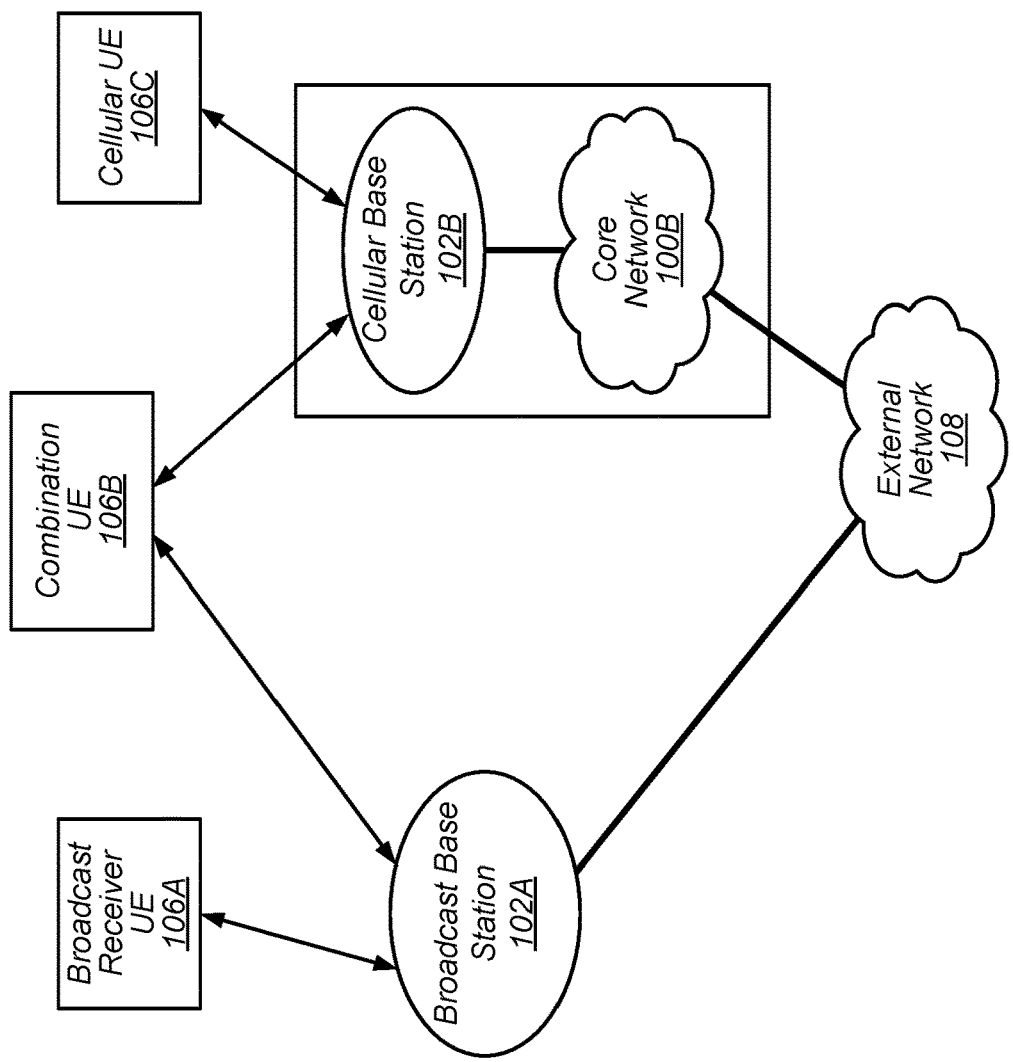
FIG. 2 is a block diagram illustrating an exemplary wireless communication environment that includes a broadcast base station and a cellular base station, according to some embodiments.

The following acronyms are used in the present disclosure.

3GPP: Third Generation Partnership Project
5G: 5th Generation
ABS: Almost Blank Subframes
ATSC: Advanced Television Systems Committee
BS: Base Station
CDMA: Code Division Multiple Access
CRS: Cell-specific Reference Signals
DRX: Discontinuous Reception
EUTRA: Evolved Universal Terrestrial Radio Access
FDD: Frequency Division Duplexing
GSM: Global System for Mobile Communications
LTE: Long Term Evolution
MAC: Medium Access Control
MBSFN: Multicast/Broadcast Single Frequency Network
MHz: MegaHertz
MIB: Master Information Block
Msps: Mega samples per second
NR: New Radio
OFDM: Orthogonal Frequency Division Multiplexing
PCFICH: Physical Control Format Indicator CHannel
PDCCH: Physical Downlink Control CHannel
PHICH: Physical Hybrid-ARQ Indicator CHannel
PLP: Physical Layer Pipe
PMCH: Physical Multicast CHannel
PRS: Positioning Reference Signals
PSS: Primary Synchronization Signal
RF: Radio Frequency
RRC: Radio Resource Control
SFN: System Frame Number
SIB: System Information Block
SSS: Secondary Synchronization Signal
TDD: Time Division Duplexing
TDM: Time Division Multiplexing
NGBP: Next Generation Broadcast Platform
RAT: Radio Access Technology
RX: Receive
SIM: Subscriber Identity Module
TX: Transmit
UE: User Equipment
UMTS: Universal Mobile Telecommunications System Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
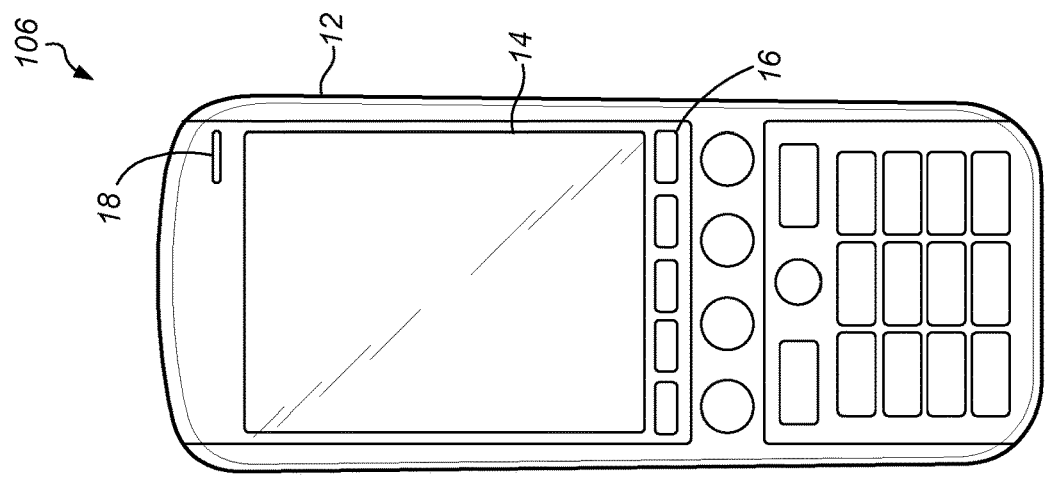
FIG. 1 is a diagram illustrating a user equipment device (UE), according to some embodiments.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as button 16, speaker port 18, and other elements (not shown), such as a microphone, data port, and possibly various types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced (LTE-A), and/or other RATs. For example, the UE 106 may support at least two radio access technologies such as LTE and GSM. Various different or other RATs may be supported as desired.

In some embodiments, UE 106 is also configured to receive broadcast radio transmissions which may convey audio and/or video content. In still other embodiments, a UE 106 may be configured to receive broadcast radio transmissions and may not be configured to perform bi-directional communications with a base station (e.g., UE 106 may be a television).

FIG. 2—Communication System and Spectrum Sharing Overview

FIG. 2 illustrates an exemplary (and simplified) wireless environment that includes multiple communication systems.

In the illustrated embodiment, different UEs and broadcast receivers are configured to communicate via a broadcast network and/or a packet-switched cellular network. It is noted that the system of FIG. 2 is merely one example of possible systems, and embodiments may be implemented in any of various systems, as desired.

As shown, the exemplary wireless communication system includes base stations 102A and 102B which communicate over a transmission medium with one or more user equipment (UE) devices, represented as UEs 106A-106C.

Cellular base station 102B may be a base transceiver station (BTS) or cell site, and may include hardware that enables wireless communication with the UE 106B and UE 106C. In the illustrated embodiment, base station 102B is also configured to communicate with a core network 100B. Core network 100B may also be coupled to one or more external networks (such as external network 108), which may include the Internet, a Public Switched Telephone Network (PSTN), and/or any other network. Thus, the base station 102B may facilitate communication between the UE devices 106B and 106C and/or between the UE devices 106B and/or 106C and the networks 100B, and/or 108.

Base station 102B and other base stations operating according to the same or different RATs or cellular communication standards may be provided as a network of cells, which may provide continuous or nearly continuous overlapping service to UE 106B and/or UE 106C and similar devices over a wide geographic area via one or more radio access technologies (RATs).

Broadcast base station 102A may be configured to broadcast multimedia content (e.g., video and audio content for TV transmissions) to a plurality of receivers such as UEs 106A and 106B. In the illustrated embodiment, broadcast base station 102A is configured to communicate with external network 108. In various embodiments, broadcast base station 102A is also configured to communicate with one or more internal networks.

The term "broadcast" refers to one-to-many transmissions that are transmitted for receiving devices in a broadcast area rather than being addressed to a particular device. Further, broadcast transmissions are typically one-directional (from transmitter to receiver). In some situations, control signaling (e.g., ratings information) may be passed back to a broadcast transmitter from the receivers, but the content data is transmitted in only one direction. In contrast, cellular communication is typically bi-directional. "Cellular" communications also may involve handover between cells. For example, when UE 106C (and/or UE 106B) moves out of the cell served by cellular base station 102B, it may be handed over to another cellular base station (and the handover may be handled by the network, including operations performed by base station 102B and the other cellular base station). In contrast, when a user moves from the range covered by a first broadcast base station to the range covered by a second broadcast base station, it may switch to receiving content from the second broadcast base station, but the base stations do not need to facilitate handover (e.g., they simply continue broadcasting and do not care which base station a particular UE is using).

Traditionally, broadcast transmissions are performed using different frequency resources than cellular transmissions. In some embodiments, however, frequency resources are shared between these different types of transmissions. For example, in some embodiments, broadcast base station 102A is configured to relinquish one or more frequency bands during scheduled time intervals for use by cellular base station 102B for packet-switched communications.

Dynamic spectrum sharing gives rise to the potential for explicit coordination between networks to ensure seamless end user connectivity. Dynamic spectrum sharing may provide means for a broadcast operator to derive additional revenue by temporarily relinquishing use of its spectrum holdings, in part or in whole, to a wireless carrier, e.g., under expressed written agreement between the respective network operators. A configurable base station, versed in the complement of underlying signaling protocols, may facilitate uninterrupted connectivity from end user devices seeking either broadcast or broadband service access (or both) at a given point in time.

In some embodiments, control signaling transmitted by a broadcast or cellular base station may allow end user devices to maintain full signaling connectivity (which may eliminate network churn), extend battery life (e.g., by determining when to remain in a low power mode when a base station is not transmitting), and/or actively manage coverage detection (e.g., rather than perceiving spectrum sharing periods as spotty coverage or a temporary network outage).

Different levels of coordination may be utilized in various embodiments. In some embodiments, a broadcast operator may relinquish its spectrum to a cellular operator for a scheduled time period with no intervening signaling to the broadcast receiver. In these embodiments, the broadcast network is inaccessible for the duration of the deferral period, leaving its receivers unaware of network status until broadcast services resume. This may be referred to as unilateral deferral. In some embodiments, the cellular operator may periodically blank its transmission to enable the broadcast operator to transmit control signaling informing broadcast receivers of its dormant period. This may notify broadcast receivers of blanking periods, but may not allow them to continue receiving broadcast data. This may be referred to as joint deferral. In some embodiments, the broadcast and cellular providers may fully coordinate and allow UEs and broadcast receivers to maintain uninterrupted connectivity to their respective networks. For example, control signaling for broadcast transmissions may include sufficient synchronization information to allow broadcast receivers to receive broadcast content in active intervals (e.g., intervals between broadcast blanking intervals during which cellular data is transmitted). This may involve superimposing cellular synchronization and cell configuration parameters with broadcast frame parameters, in some embodiments.

The base stations 102A and 102B and the UEs 106A, 106B, and 106C may be configured to communicate over the transmission medium using any of various RATs (also referred to as wireless communication technologies or telecommunication standards), such as LTE, Next Generation Broadcast Platform (NGBP), W-CDMA, TDS-CDMA, and GSM, among possible others such as UMTS, LTE-A, CDMA2000 (e.g., 1×RTT, 1×EV-DO, HRPD, eHRPD), Advanced Television Systems Committee (ATSC) standards, Digital Video Broadcasting (DVB), etc.

Broadcast and cellular networks are discussed herein to facilitate illustration, but these technologies are not intended to limit the scope of the present disclosure and the disclosed spectrum sharing techniques may be used between any of various types of wireless networks, in other embodiments.

Figure 3:
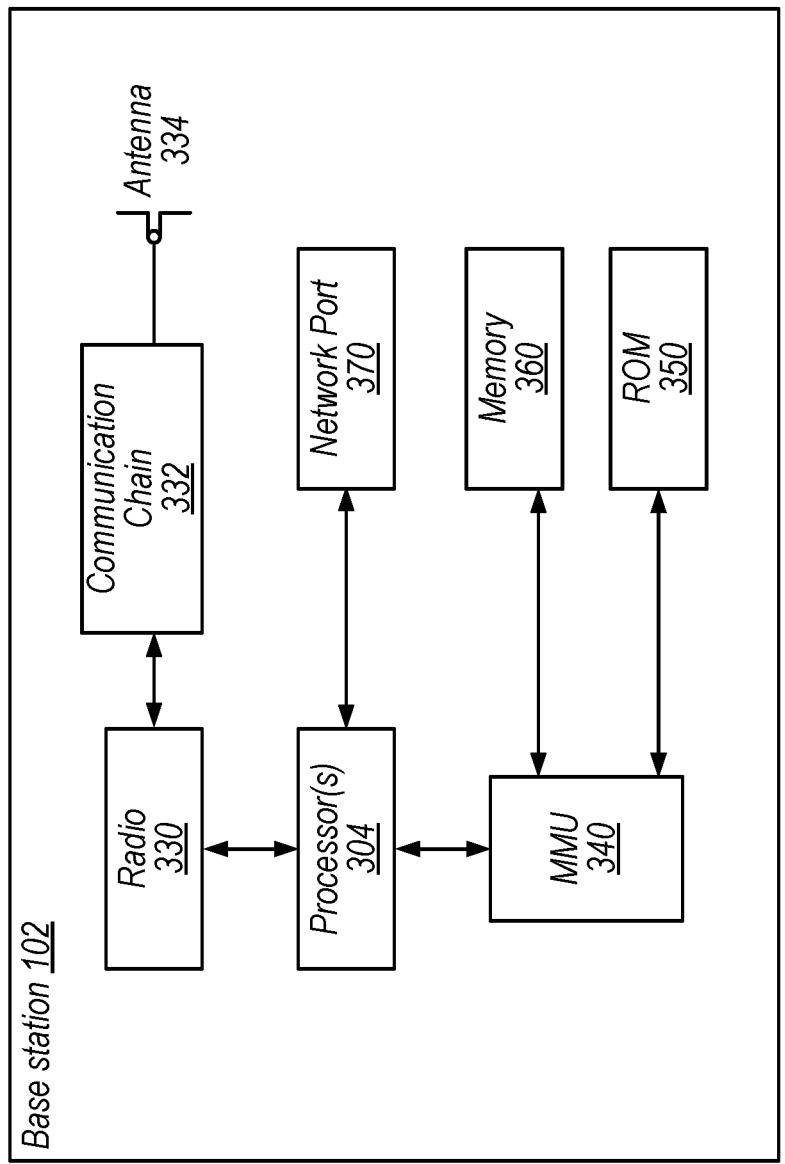
FIG. 3 is a block diagram illustrating an exemplary base station, according to some embodiments.

FIG. 3—Base Station

FIG. 3 illustrates an exemplary block diagram of a base station 102. In some embodiments, base station 102 may be a broadcast base station such as base station 102A of FIG. 2 and/or a cellular base station such as base station 102B of FIG. 2. It is noted that the base station of FIG. 3 is merely one example of a possible base station. As shown, the base station 102 may include processor(s) 304 which may execute program instructions for the base station 102. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above. In some embodiments, the network port 370 (or an additional network port) may be coupled to a television network and configured to receive content for broadcasting. The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices 106 serviced by the cellular service provider).

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332 in the illustrated embodiment. Communication chain 332 may be a receive chain, a transmit chain or both. The radio 330 may be configured to communicate via various RATs.

The processor(s) 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

In some embodiments, base station 102 is configured to perform both broadcast and bi-directional packet-switched communications. In these embodiments, base station 102 may include multiple radios 330, communication chains 332, and/or antennas 334, for example. In other embodiments, the disclosed spectrum sharing techniques may be performed by different base stations configured to perform only broadcast transmissions or only packet-switched communications.

Figure 4:
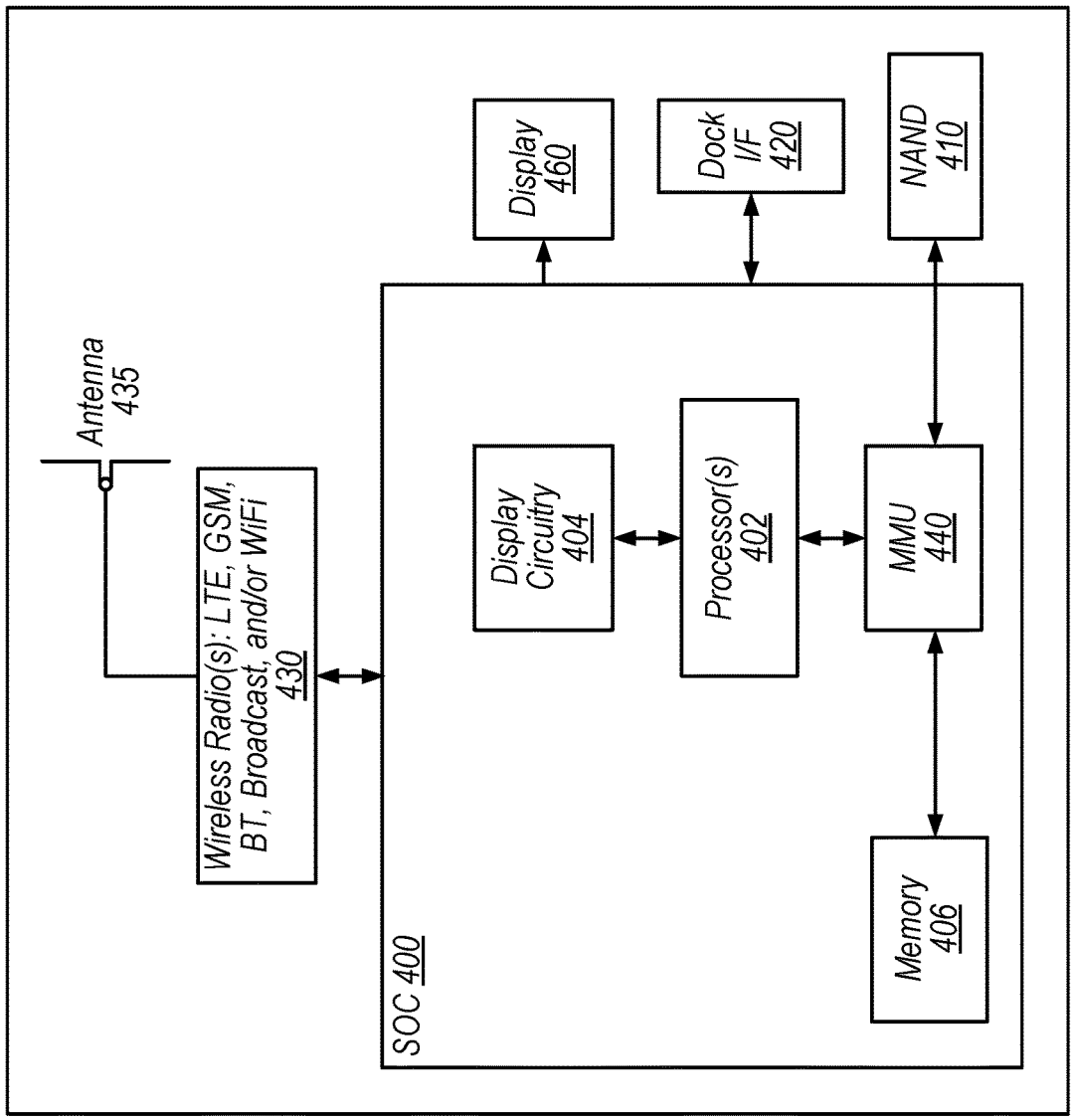
FIG. 4 is a block diagram illustrating an exemplary UE, according to some embodiments.

FIG. 4—User Equipment (UE)

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, wireless communication circuitry 430 such as for LTE, GSM, Bluetooth, WLAN, and/or broadcast, etc. The UE 106 may further comprise one or more smart cards that implement SIM (Subscriber Identity Module) functionality. The wireless communication circuitry 430 may couple to one or more antennas, such as antenna 435.

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406 or NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

In some embodiments (not shown), UE 106 is configured to receive wireless broadcasts, e.g., from broadcast base station 102A of FIG. 2. In these embodiments, 106 may include a broadcast radio receiver. In some embodiments, UE 106 is configured to receive broadcast data and perform packet-switched cellular communications (e.g., LTE) at the same time using different frequency bands and/or the same frequency resources during different time slices. This may allow users to view TV broadcasts while performing other tasks such as browsing the internet (e.g., in a split-screen mode), using web applications, or listening to streaming audio. In other embodiments, the disclosed techniques may be used in systems with devices that are configured as broadcast receivers or for cellular communications, but not both.

The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 460 may be configured to implement part or all of the features described herein.

Figure 5:
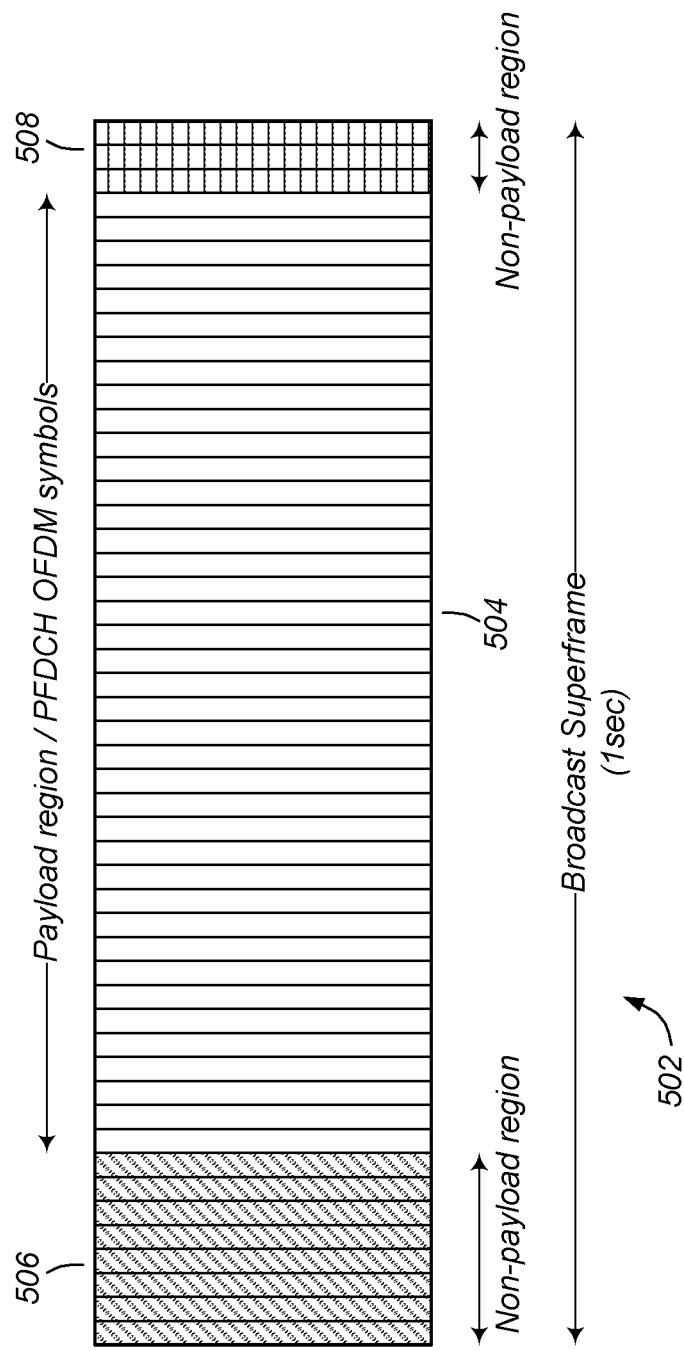
FIG. 5 is a diagram illustrating an exemplary broadcast frame, according to some embodiments.

FIG. 5—Exemplary Broadcast Frame

FIG. 5 illustrates a generalized broadcast super-frame structure 502, according to some embodiments. In the illustrated embodiment, the super-frame occupies a 1-second duration that is independent of underlying frame configuration. In some embodiments, this fixed duration may facilitate coordination with a cellular network transport layer. The illustrated super-frame 502 includes a payload region 504 which carries actual payload data, and zero or more non-payload regions 506 and 508 which may carry control or other signaling information. In the example shown, separate non-payload regions 506 and 508 are indicated by the shaded areas at the beginning and end of the frame 502. The relative lengths in time (horizontal axis) and numbers of symbols for each region may not be shown to scale in this example diagram.

In some embodiments, the initial non-payload region 506 serves as a preamble that provides initial synchronization and frame configuration to receiver devices. In some embodiments, detection of a particular preamble may set the context by which the remaining preamble symbols are to be detected. For example, if base station 102A relinquishes a portion of its spectrum to LTE, it may indicate a separate context signaled in the broadcast preamble as "private". In some embodiments, other fields may indicate various information to receiving devices, e.g. how long the transport will be occupied and the bandwidth of the signal. For example, a broadcast receiver device may use this information to determine when to begin monitoring for broadcast data again. A cellular device may use this information to determine how long it can transmit data in a borrowed frequency band. In some embodiments, broadcast receivers are configured to ignore super-frames that belong to a service context other than that which the broadcast device is equipped to receive.

Figure 6:
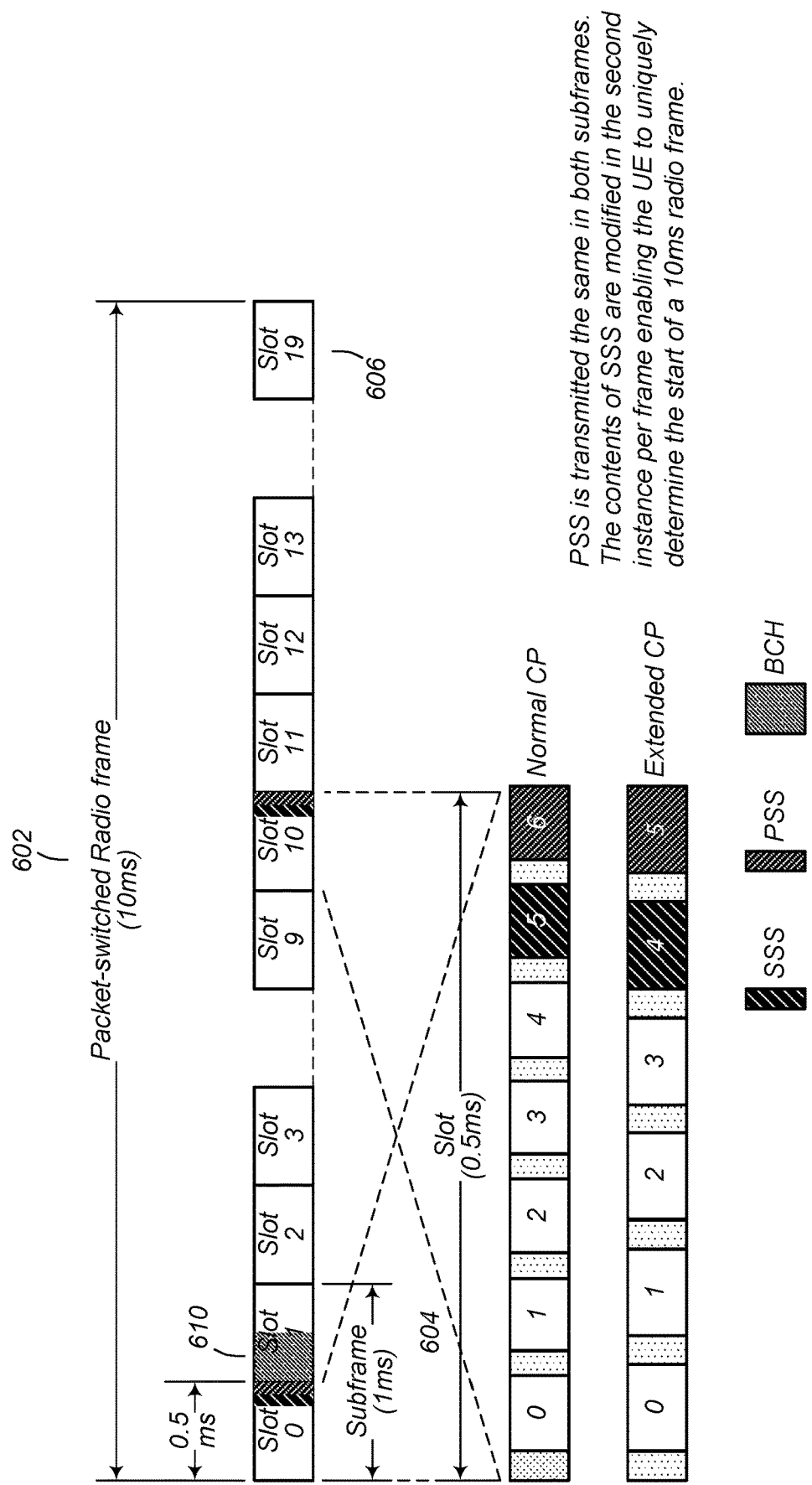
FIG. 6 is a diagram illustrating an exemplary LTE radio frame, according to some embodiments.

FIG. 6—Exemplary Cellular Frame

FIG. 6 illustrates an exemplary cellular radio frame (an LTE frame in the illustrated example). In the illustrated embodiment, a cellular radio frame 602 comprises multiple subframes 604. In the illustrated embodiment, each subframe is 1ms in length and is composed of two 0.5 ms slots 606. The illustrated frame may be used for bi-directional, packet-switched cellular communications, in various embodiments.

Primary and secondary synchronization signals, PSS and SSS, are inserted in subframes 0 and 5 in slots 0 and 10, in the illustrated embodiment. PSS may be transmitted identically in both subframes. The SSS contents may be modified in the second instance per frame, which may enable the UE to uniquely determine the start of a 10 ms radio frame. In some embodiments, PSS and SSS are immediately followed by a physical broadcast channel (BCH) 610 only in the first subframe of a radio frame. The BCH may convey frame configuration to the broadband receiver. Note that the term "broadcast" in the context of BCH refers to control signaling that is distributed equally to receivers within an LTE cell and is thus different than broadcast data content distributed by a broadcast base station.

Figure 7:
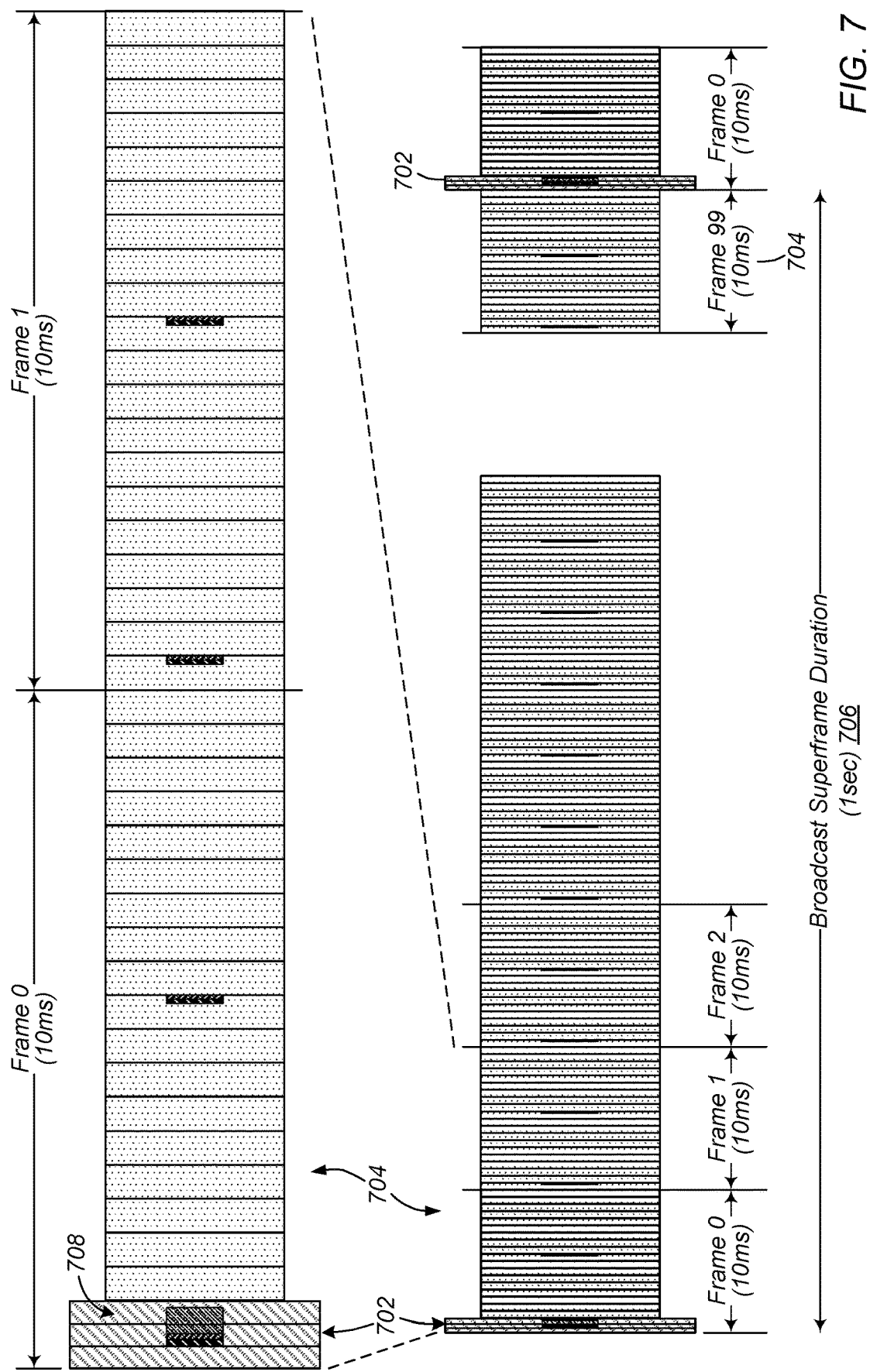
FIG. 7 is a diagram illustrating exemplary control signaling for spectrum sharing between LTE and broadcast transmissions, according to some embodiments.

FIG. 7—Exemplary Signaling Structures for Coordination of Spectrum Sharing

FIG. 7 illustrates incorporation of universal signaling into an LTE frame structure. In various embodiments, control signaling may be used to indicate time intervals during which frequency bands will be available. This may signal to broadcast and broadband receivers alike the intended use of spectrum resources in any given frame period.

In the illustrated embodiment, a preamble 702 is transmitted in the first LTE subframe 704 corresponding to the start of the broadcast super-frame duration 706. In some embodiments, this may require synchronization of the broadcast super-frames with LTE frames (e.g., the super-frame should begin at the same time as an LTE frame, in some embodiments). Preamble 702 may be a "hybrid" preamble in the sense that both broadcast and cellular control signaling are transmitted by the respective networks during the preamble interval. This signaling may be transmitted using different time and/or frequency resources to avoid interference, in some embodiments.

In some embodiments, the broadcast portion of preamble 702 contains initial synchronization information plus any additional configuration parameters the broadband provider wishes to advertise in the broadcast cell. In some embodiments, the first broadcast symbol is sent as it would be in a normal broadcast mode, which may ensure robust signal detection. In the illustrated embodiment, the remaining symbols transmitted from the broadband base station are modified (e.g., by blanking at least a portion of the frequency spectrum during these intervals) as needed to accommodate signaling fields destined for the cellular receiver, e.g.

PSS, SSS and BCH, enabling continued network connectivity despite the presence of the surrounding broadcast signaling.

Thus, in some embodiments, broadcast symbols overlapping the broadband signaling fields 708 are notched to accommodate PSS, SSS and BCH. In some embodiments, these cellular fields nominally occupy 72 subcarriers surrounding the center carrier at 15 kHz subcarrier spacing (1.080 MHz). In these embodiments, the broadcast base station 102A may zero out the equivalent signal bandwidth to avoid compromising the integrity of the cellular signaling fields.

Further, cellular base station 102B may suspend scheduling of user data in subframe zero as it overlaps the broadcast preamble 702. The data loss in subframes available for user data scheduling ($1/1000^{th}$ in the illustrated embodiment) may be inexpensive relative to the ability to share frequency spectrum with the broadcast base station 102A. Normal cellular data scheduling may resume after subframe zero for the remainder of the super-frame duration.

In some embodiments, a single base station (e.g., a base station configured for both broadcast and cellular transmissions) may be configured to transmit the entire preamble 702. Further, in some embodiments, a cellular base station may be configured to transmit a portion of the broadcast control signaling and/or vice versa, to facilitate scheduling.
Exemplary Spectrum Sharing Between LTE and NGBP In some embodiments, a configurable eNB is configured to transmit both NGBP (broadcast) and EUTRA (Evolved Universal Terrestrial Radio Access) (LTE, Long Term Evolution) (cellular) signals using similar bandwidths in the same frequency spectrum by time interleaving the two signals. Maintaining correct time alignment between the NGBP and EUTRA signals may be relatively simple if the same base station (eNB, evolved Node B) is transmitting both signals. In these embodiments, an eNB may transmit a single signal, portions of which correspond to the NGBP waveform while other portions of the signal correspond to the EUTRA waveform. In other embodiments, (e.g., embodiments in which different base stations are configured as broadcast-only or cellular-only) coordination between the different networks may be needed for the time alignment.

The embodiments discussed below utilize NGBP and LTE for illustrative purposes, but similar techniques may be used for other broadcast and/or cellular protocols (such as NGBP, GSM, etc.) or may be used for protocols that are not broadcast or cellular in nature in other embodiments.

In some embodiments, MBSFN (Multicast/Broadcast Single Frequency Network) subframes may be used by the cellular network for blanking to leave spectrum for broadcast transmissions. In these embodiments, a EUTRA downlink signal may be configured with MBSFN subframes. In FDD (Frequency Division Duplex) EUTRA systems, subframes 1, 2, 3 and 6, 7, 8 of each 10 ms EUTRA radio frame may be configured as MBSFN subframes. MBSFN subframes may have the property that an EUTRA signal need only be transmitted in the first 1 or 2 OFDM (Orthogonal Frequency Division Multiplexing) symbols of a 1 ms subframe, while the remaining 13 or 12 OFDM symbols respectively may be left blank with no signal being transmitted. In particular, no EUTRA reference symbols need be transmitted in the OFDM symbols belonging to the MBSFN region of an MBSFN subframe. This implies that a blank area with a time length of 0.857 ms (12 OFDM symbols) or 0.929 ms (13 OFDM symbols) may exist in each MBSFN subframe.

Assuming an example sampling rate of 12.288 Msps (Mega samples per second) for the NGBP signal, MBSFN subframes with this blank area correspond to approximately 10500 or 11400 samples available for NGBP use in the blank areas of the MBSFN subframes for blank areas of length 12 or 13 OFDM symbols, respectively. (Note that this is an example sampling rate, and higher sampling rates for NGBP have also been proposed and could be selected in a dynamic fashion.) For example, this set of samples is sufficient for either two NGBP OFDM symbols using a 4096 FFT (Fast Fourier Transform) or one NGBP OFDM symbol using an 8192 FFT, plus an appropriately-sized cyclic prefix.

An NGBP frame may be configured with multiple partitions, which may be referred to as Physical Partition Data CHannels (PPDCH). Exemplary techniques for forming broadcast frame payloads with multiple PPDCHs are discussed in U.S. patent application Ser. No. 14/805,004 "Multi-Partition Radio Frames," which was filed Jul. 21, 2015, has issued as U.S. Pat. No. 9,438,459, and is incorporated by reference herein in its entirety. For time interleaving NGBP and EUTRA signals, one or more PPDCHs may be configured to carry the NGBP data during the blank areas of the EUTRA MBSFN subframes, while one or more blanking PPDCHs may be configured to correspond to the active portions of the EUTRA signals. These latter NGBP PPDCHs may be configured such that no NGBP signal is transmitted during those PPDCHs (including suppressing any NGBP reference symbols), so as not to interfere with the EUTRA signal. In some embodiments, broadcast base station 102A is configured to inform NGBP receivers that NGBP reference symbols will not be transmitted during blank partitions, and the NGBP receivers may take this information into account while performing channel estimation.

The disclosed techniques may be implemented using LTE time division duplex (TDD) radio frames, LTE frequency division duplex (FDD) radio frames, and/or other types of radio frames in various embodiments or situations. Depending on the configuration of the cellular radio frames used, signaling information may be transmitted during different time and/or frequency portions of the cellular frames.

Figure 8:
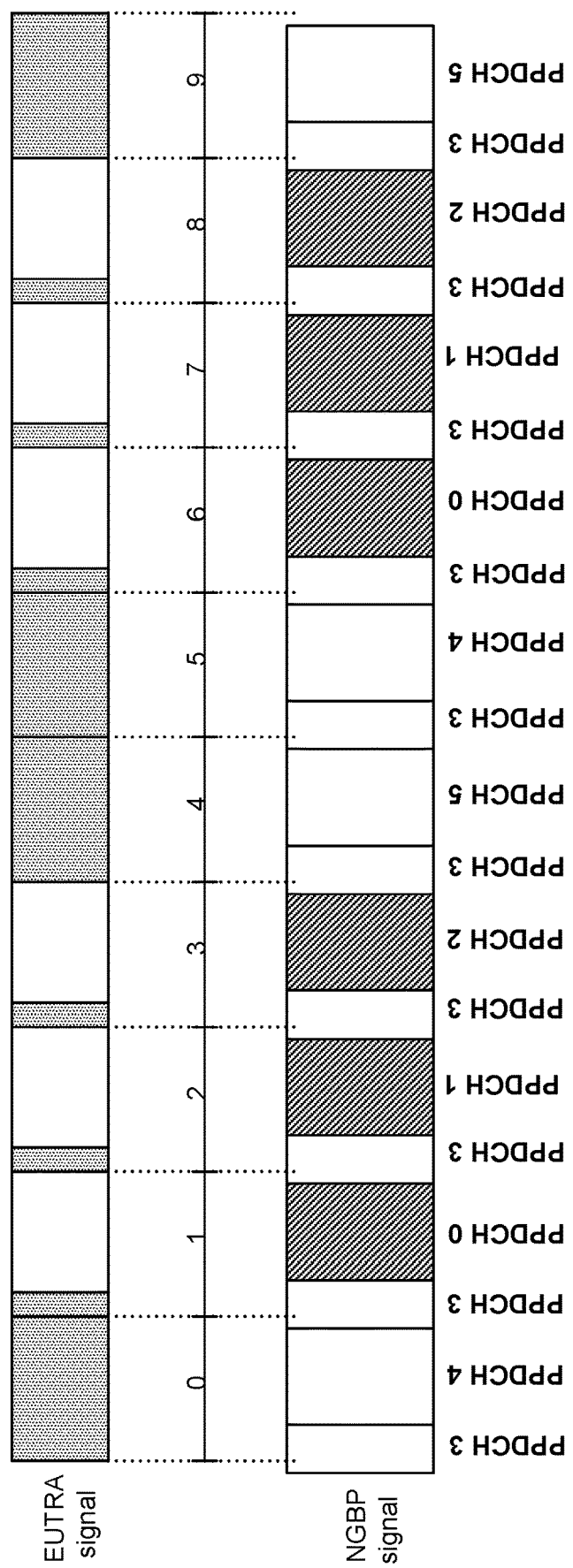
FIG. 8 is a diagram illustrating exemplary blanking periods of LTE and broadcast transmissions for spectrum sharing, according to some embodiments.

FIG. 8 is a signal diagram illustrating an exemplary time interleaving between broadcast and cellular transmissions, according to some embodiments. This example uses a sampling rate of 12.288 Msps for NGBP, but various sampling rates may be used as appropriate. Note that while FIG. 8 shows a particular frequency band, broadcast transmissions may or may not continue on other frequency bands during relinquishment of the illustrated band.

In the illustrated example, PPDCHs 0, 1, and 2 carry NGBP broadcast data. In this example, each of these PPDCHs is configured to use an FFT size of 4096, with a cyclic prefix length of 512 samples. This results in a total of 9216 samples for two consecutive OFDM symbols, which fits within the blank area of an EUTRA MBSFN subframe, in the illustrated embodiment. (Alternatively, one OFDM symbol with an FFT size of 8192 and a cyclic prefix length of 1024 samples may be used for the same total length of 9216 samples.) In this example, PPDCH 0 has a periodicity of 5 ms to cover MBSFN subframes 1 and 6, PPDCH 1 has a periodicity of 5 ms to cover MBSFN subframes 2 and 7, and PPDCH 2 has a periodicity of 5 ms to cover MBSFN subframes 3 and 8.

In the illustrated example, PPDCH 3 is a blank partition that corresponds to the initial portion of each MBSFN subframe (which carries an active EUTRA signal). A 1 ms EUTRA subframe corresponds to 12288 NGBP samples during the same time period. Of these samples, 9216 are assigned to PPDCH 0, 1, or 2, depending upon the actual subframe index in question. This leaves 3072 samples for PPDCH 3, which may therefore be configured to use OFDM symbols with an FFT size of 2048 and a cyclic prefix length of 1024 samples, for example. PPDCH 3 may have a periodicity of 1 ms to cover the initial portion of each subframe (as well as a small part of the final portion of the preceding subframe, in this example).

In the illustrated example, PPDCH 4 and 5 are blank partitions that correspond to the active EUTRA portions of non-MBSFN subframes 0, 4, 5, and 9. These two partitions may use the same configurations as data-carrying partitions 0, 1, 2 (i.e. two OFDM symbols with an FFT size of 4096 and a cyclic prefix length of 512 samples or one OFDM symbol with an FFT size of 8192 and a cyclic prefix length of 1024 samples, and a periodicity of 5 ms).

In the illustrated embodiment, shaded areas represent an active transmission for the corresponding waveform, while unshaded areas represent no active transmission for the corresponding waveform. As can be seen from the diagram, the active portions of the NGBP signal (PPDCHs 0, 1, and 2) fall within the non-active portions of the EUTRA signal (the MBSFN portions of EUTRA subframes 1, 2, 3 and 6, 7, 8) (and vice versa), so that there is no collision between the two waveforms.

The following table summarizes the exemplary NGBP PPDCH configurations corresponding to FIG. 8.

Exemplary Spectrum Sharing Embodiments for Local/Regional Broadcasts

In some embodiments, spectrum sharing techniques may be used to share spectrum between broadcasts of local content and broadcast of regional content (where regional content refers to content intended for a larger area than the local content). In some embodiments, a single base station is configured to transmit both types of content, and is configured to transmit the local content in some partitions of a broadcast frame and the regional content in other partitions of a broadcast frame. In these embodiments, the local/regional content may also be targeted for particular types of devices, e.g., mobile devices, fixed devices, etc.

In other embodiments, a regional broadcast base and one or more local broadcast base stations may be configured to share spectrum. For example, the regional broadcast base station may be configured to blank partitions corresponding to transmissions by the one or more local base stations. In these embodiments, the base stations may communicate to coordinate synchronization of broadcast frames and/or to configure which base stations transmit or blank during which intervals.

In some embodiments, time slices for use of spectrum in the same frequency band may be allocated to: local broadcast content, regional broadcast content, and bi-directional packet-switched communications.

| Quantity | PPDCH 0 | PPDCH 1 | PPDCH 2 | PPDCH 3 | PPDCH 4 | PPDCH 5 |
|---|---|---|---|---|---|---|
| FFT size | 8192 | 8192 | 8192 | 2048 | 8192 | 8192 |
| Cyclic prefix length | 1024 | 1024 | 1024 | 1024 | 1024 | 1024 |
| Absolute index of first OFDM symbol | 3 | 5 | 7 | 0 | 1 | 9 |
| OFDM symbol periodicity | 10 | 10 | 10 | 2 | 10 | 10 |

In some embodiments, the control signaling transmitted in (e.g., in a preamble at the beginning of) an NGBP frame may correspond to multiple LTE subframes. For example, the length of the PFCCH (Physical Format Control CHannel) and PCCCH (Physical Content Control CHannel), both of which are discussed in the '004 Patent Application and corresponding '459 Patent, together may likely interfere with several of the EUTRA subframes. This may happen only once per NGBP frame, however, e.g., once per second. Further, in some embodiments the PFCCH and PCCCH locations are time-aligned with MBSFN subframes to minimize impact on EUTRA user devices. In some embodiments, the cellular base station 102B is configured to avoid scheduling transmissions to EUTRA devices during any overlap period with the NGBP PFCCH and PCCCH in order to reduce potential signal collisions. Finally, in some embodiments, a particular preamble value for the PFCCH may be used to signal the NGBP receivers that the PCCCH format is a special format (e.g. with some time gaps to avoid interfering with non-MBSFN subframes) rather than a normal NGBP signal.

In embodiments in which a single base station is configured to transmit both EUTRA and NGBP signals, these signals may occupy the same (or similar) bandwidths with the same carrier frequency, which may avoid RF issues such as needing to retune the radio to a different frequency when switching between the two signals. In other embodiments, the signals may occupy different, overlapping bandwidths and/or use different carrier frequencies.

Exemplary Coordination Schemes for Spectrum Sharing

In some embodiments, spectrum may be allocated using an exchange over which broadcast providers can list spectrum that they are willing to relinquish and cellular providers can purchase use of the listed spectrum. Broadcast providers may list particular percentages of the time that they are willing to relinquish spectrum (e.g., based on the size of partitions in broadcast frames that they are willing to blank), particular intervals during which they are willing to relinquish spectrum, etc. In some embodiments, the exchange may also allow providers to coordinate frame synchronization and configuration of which base stations are configured to blank during what time intervals.

In some embodiments, a centralized system is configured to determine and indicate spectrum sharing configurations, but is not configured to do so via an exchange. In some embodiments, decisions on how to share spectrum may be made in a distributed manner. For example, a broadcast base station may determine its spectrum usage based on current programming and communicate its ability to relinquish spectrum to nearby cellular base stations. The nearby base stations (e.g., stations with overlapping coverage areas) may then coordinate spectrum sharing parameters among themselves in a de-centralized manner. These communications between broadcast and/or cellular base stations may or may not be performed wirelessly. In some embodiments, fields for such communications may be added to cellular and/or broadcast frame structures.

Figures 9, 10:
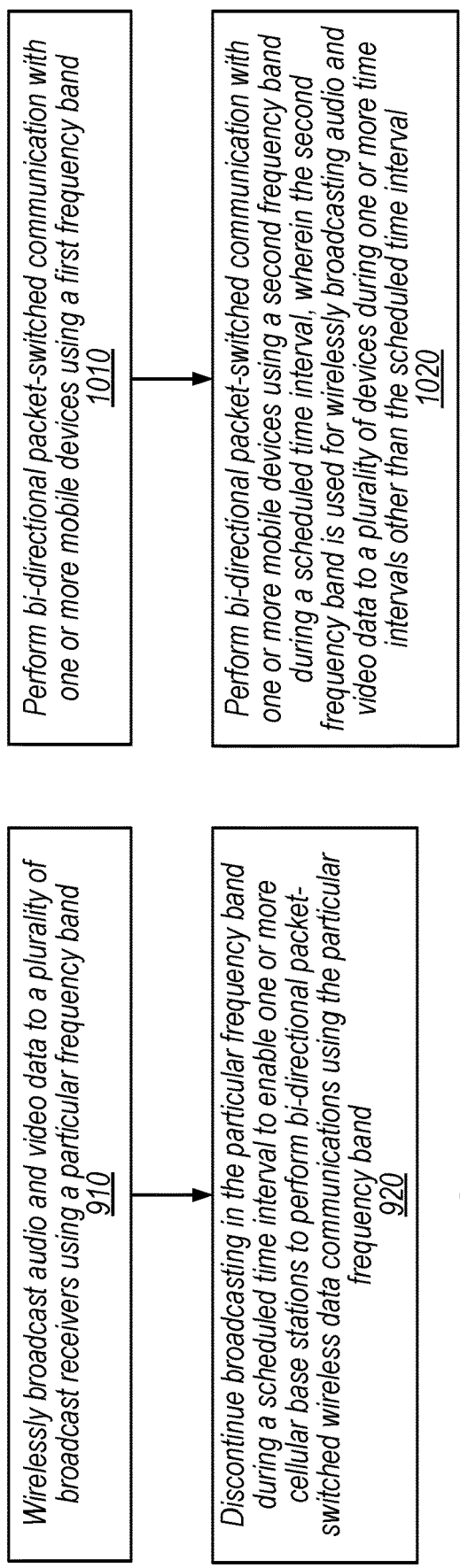
FIG. 9 is a flow diagram illustrating a method for operating a broadcast base station, according to some embodiments.
FIG. 10 is a flow diagram illustrating a method for operating a cellular base station, according to some embodiments.
Figure 11:
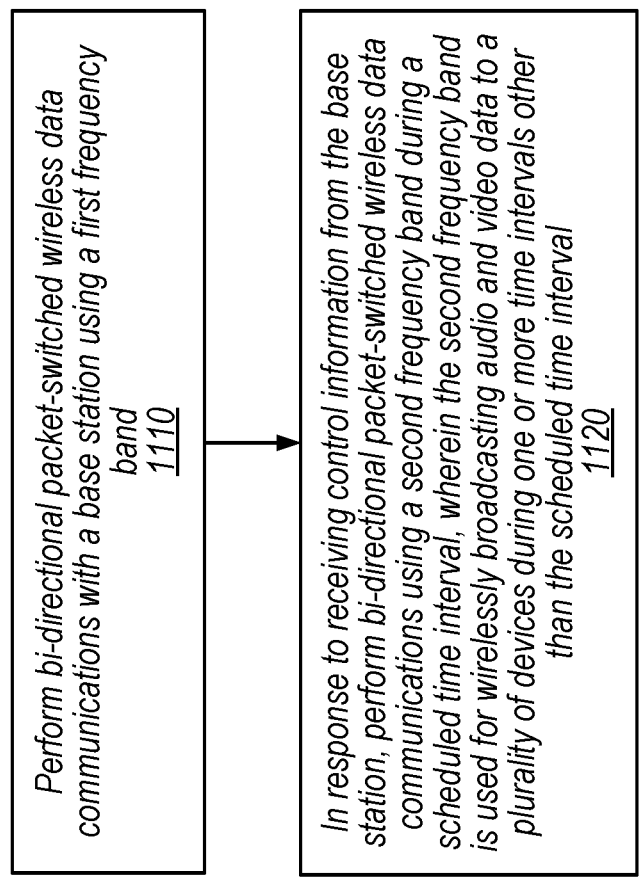
FIG. 11 is a flow diagram illustrating a method for operating a UE, according to some embodiments.

FIGS. 9-11—Exemplary Methods

Turning now to FIG. 9, a flow diagram illustrating one exemplary embodiment of a method for operating a broadcast base station is shown. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, broadcast base station 102A wirelessly broadcasts audio and video data to a plurality of broadcast receivers using a particular frequency band. In some embodiments, this may be a portion of the UHF band, which ranges from 470 to 884 MHz. In other embodiments, any of various frequency bands may be utilized.

At 920, broadcast base station 102A discontinues broadcasting on the particular frequency band during a scheduled time interval to enable one or more cellular base stations (e.g., cellular base stations 102B) to perform bi-directional packet-switched wireless data communications using the particular frequency band. In some situations, the particular frequency band may be only a portion of the spectrum in which the broadcast base station is configured to transmit while in other situations the broadcast base station may relinquish its entire spectrum. As shown in FIG. 8, in some embodiments the scheduled time interval may correspond to a portion of a 1 ms LTE subframe.

In some embodiments, the base station is configured to transmit on the particular frequency band during other scheduled time intervals, e.g., during other subframes of a particular LTE frame. In some embodiments, the base station is configured to transmit control signaling to receiving user devices and the control signaling indicates time intervals during which the broadcast base station will blank transmissions.

Turning now to FIG. 10, a flow diagram illustrating one exemplary embodiment of a method for operating a cellular base station is shown. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1010, cellular base station 102B performs bi-directional packet-switched communication with one or more mobile devices using a first frequency band. The first frequency band may be a band assigned to a cellular provider associated with base station 102B for cellular communications.

At 1020, cellular base station 102B performs communication with one or more mobile devices using a second frequency band during a scheduled time interval. In the illustrated embodiment, the second frequency band is used for wirelessly broadcasting audio and video data to a plurality of devices during one or more time intervals other than the scheduled time interval. For example, the second frequency band may be assigned to a broadcast provider associated with broadcast base station 102A. The broadband provider may agree, however, not to use at least a portion of its spectrum during the scheduled time interval. In some embodiments, cellular base station 102B may include multiple radios configured to communicate using the different first and second frequency bands. The cellular base station 102B may notify UEs to communicate via the second frequency band during the scheduled time interval.

Turning now to FIG. 11, a flow diagram illustrating one exemplary embodiment of a method for operating a UE is shown. The method shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1110, a UE performs bi-directional packet-switched wireless data communications with a base station using a first frequency band. In some embodiments, this may be performed within a cellular frequency band, which may vary from country to country, but are often specified in bands of 10 to 100 MHz between 700 MHz and 3600 MHz.

At 1120, the UE, in response to receiving control signaling from the base station, performs bi-directional packet-switched wireless data communications using a second frequency band during a scheduled time interval. In the illustrated embodiment, the second frequency band is used for wirelessly broadcasting audio and video data to a plurality of devices during one or more time intervals other than the scheduled time interval. This may allow the UE to communicate using frequency bands normally reserved for broadcast transmissions, which may increase data rates, reduce power consumption, increase battery life, etc., relative to communicating in a congested frequency band.

Figure 12:
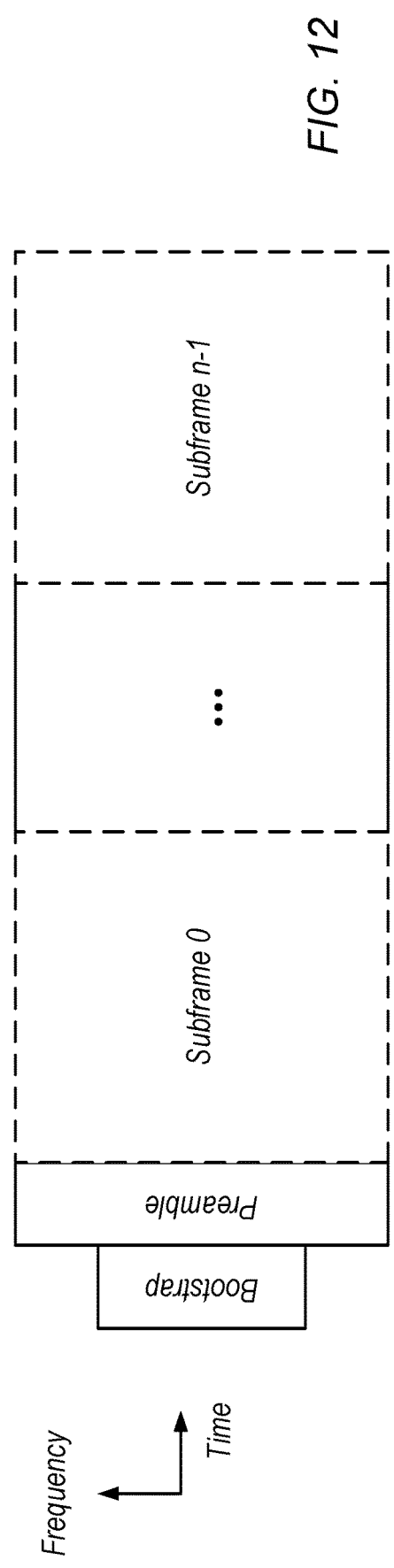
FIG. 12 is a diagram illustrating an example ATSC 3.0 physical layer frame, according to some embodiments.

Overview of example ATSC 3.0 Physical Layer Frames and Example Cellular Standards FIG. 12 shows an overview of an ATSC 3.0 physical layer frame. ATSC 3.0 frames are discussed here for purposes of illustration, but are not intended to limit the scope of the present disclosure. Similar techniques may be applied to physical layer frames of any of various broadcast standards.

Details of ATSC 3.0 frames are described in Section 7.2.2.1 of Advanced Television Systems Committee, "ATSC Standard: Physical Layer Protocol", Doc. A/322:2017, Jun. 6, 2017 ("A/322" hereafter). As can be seen, each physical layer frame includes a bootstrap portion at the beginning of the frame, immediately followed by a preamble portion which contains control signaling information, and then one or more subframes which contain actual payload data in the form of Physical Layer Pipes (PLPs).

Figure 13:
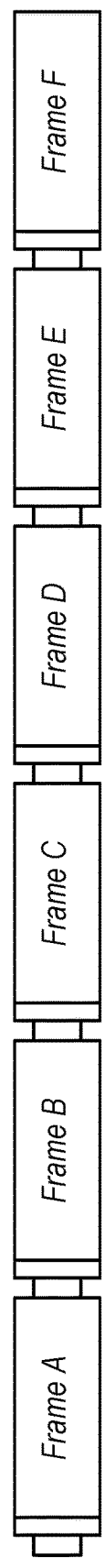
FIG. 13 is a diagram illustrating example contiguous transmission of broadcast frames, according to some embodiments.

A typical ATSC 3.0 broadcast waveform includes multiple physical layer frames time-division multiplexed together in the same RF channel. FIG. 13 shows an example of one such time-division multiplexing of physical layer frames.

ATSC 3.0 physical layer frames are either time-aligned or symbol-aligned. Time-aligned frames have a total length corresponding to an integer multiple of 5 ms, in the range from 50 ms to 5 s, inclusive. Symbol-aligned frames generally have a frame length that is not an integer number of milliseconds, where the total frame length of a symbol-aligned frame is equal to the sum of the lengths of the bootstrap and the OFDM symbols which comprise the preamble and subframe portions of the frame. The length of a symbol-aligned frame can be measured in units of samples, where the sampling rate depends on the configured system bandwidth of the ATSC 3.0 waveform as shown in the following table of ATSC 3.0 sampling rates as a function of system bandwidth

| System Bandwidth | Sampling Rate |
|---|---|
| 6 MHz | 6.912 Msps |
| 7 MHz | 8.064 Msps |
| 8 MHz | 9.216 Msps |

An ATSC 3.0 physical layer frame always begins with a bootstrap, which acts as the entry point into the physical layer frame. That is, an ATSC 3.0 receiver will search for a bootstrap to identify and synchronize with the beginning of an ATSC 3.0 physical layer frame.

The bootstrap has a very distinct structure which allows it to be easily identified by a receiver. The bootstrap also carries a small number of very robust signaling fields to indicate initial information that a receiver can use to begin decoding the remainder of the physical layer frame.

One of the bootstrap signaling fields is min_time_to_next, which indicates a time window during which the next bootstrap of the same version will appear, as discussed in section 6.1.1.1 of Advanced Television Systems Committee, "ATSC Standard: A/321, System Discovery and Signaling", Doc. A/321:2016, Mar. 23, 2016 ("A/321" hereafter). An ATSC 3.0 receiver can use this information, optionally together with the length of the corresponding physical layer frame to determine when to search for the bootstrap identifying the beginning of the next physical layer frame of interest.

EUTRA (LTE) is used here as an example wireless communications system or Radio Access Technology (RAT). This RAT is discussed in 3GPP TS 36.300, "EUTRA: Overall description", V15.3.0 (2018-09) ("36.300"), for example. The discussions of EUTRA herein are not intended to limit the scope of the present disclosure. The techniques disclosed here may also be applied to various other wireless systems such as 3GPP 5G NR, for example. Example 5G NR parameters are discussed in 3GPP TS 38.300, "NR and NG-RAN Overall Description," V15.3.1 (2018-10).

EUTRA frames have a time length of 10 ms and are composed of ten subframes, each with a time length of 1 ms, as described in Section 4 of 3GPP TS 36.211, "EUTRA: Physical channels and modulation", V15.3.0 (2018-09) ("36.211"). Each frame is indexed with a System Frame Number (SFN), which ranges from 0 to 1023, inclusive. Hence, a complete SFN cycle corresponds to a time period of 10.24 seconds.

An EUTRA handset (or UE (User Equipment)) can be instructed to transmit data, receive data, or both for a given subframe. Similarly, an EUTRA base station (BS) can transmit data, receive data, or both for a particular subframe. Additionally, remaining idle (i.e. no transmission or reception) for one or more subframes is also a possibility for both UEs and BSs, with the understanding that the scheduling of data transmissions in either the uplink (UE to BS) or downlink (BS to UE) directions is under the control of the BS. In other cellular standards, UEs may be instructed to transmit, receive, or remain idle at other granularities in addition to or in place of subframes.

Discontinuous reception (DRX) operation for EUTRA is specified in Section 5.7 of 3GPP TS 36.321, "EUTRA: Medium Access Control (MAC) protocol specification", V15.3.0 (2018-09) ("36.321"). DRX, in some embodiments, allows a UE to discontinue monitoring the Physical Downlink Control Channel (PDCCH) for a certain period of time, which can essentially allow a UE to disable reception and transmission for this amount of time. DRX is often used as a power-saving measure for battery-operated UEs.

In its simplest form, a DRX cycle corresponds to a particular length of time which is divided into Active Time (when a UE may be actively receiving and/or transmitting) and non-Active Time (when the UE is not actively receiving or transmitting).

A number of different UE-specific timers control when a UE is considered to be in Active Time (and, conversely, when the UE is considered to be in non-Active Time).

These timers can be configured on a per-UE basis and can be configured quite precisely to control the Active Time duration. Additionally, a DRX Command MAC control element (discussed in Section 6.1.3.3 of 36.321) can be sent to a UE to instruct the UE to stop certain DRX-related timers, which generally results in the UE immediately entering non-Active Time.

Figure 14:
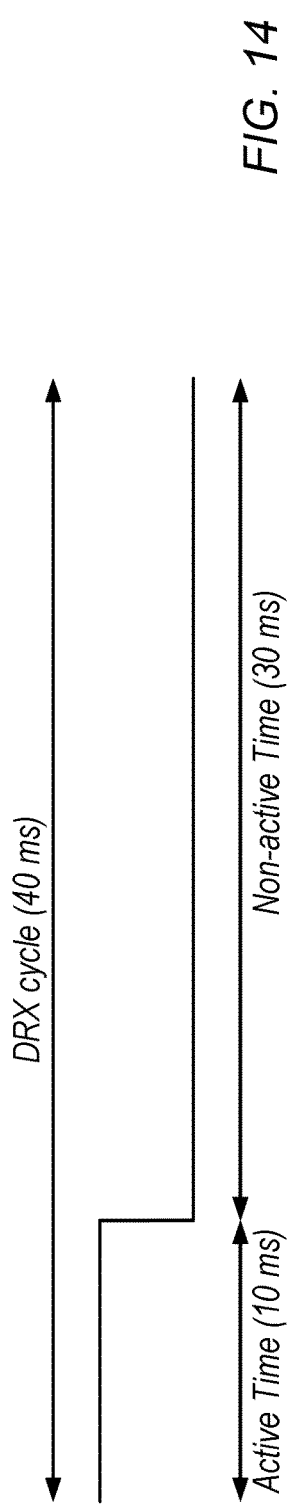
FIG. 14 is a diagram illustrating an example discontinuous reception (DRX) cycle, according to some embodiments.

FIG. 14 shows an example of DRX activity at a UE, where the DRX cycle length is 40 subframes (40 ms) and the Active Time of the DRX cycle is 10 subframes (10 ms). Consequently, the non-Active Time of this DRX cycle is 30 ms in length.

Each active UE on a particular EUTRA carrier can be configured individually for DRX operation with DRX parameters that are independent of any other UE's configuration (i.e. a particular UE can be configured with DRX parameters that are either the same or different as the DRX parameters for another UE). DRX parameters include, but are not limited to, the length of the DRX cycle, the amount of Active Time, and the particular starting point (a specific subframe) of a UE's DRX cycle.

DRX cycle time lengths may include, but are necessarily not limited to, {10, 20, 32, 40, 64, 80, 128, 160, 256, 320, 512, 640, 1024, 1280, 2048, 2560} ms. DRX On Duration Timer values (which can control the amount of Active Time) may include, but are not necessarily limited to, {1, 2, 3, 4, 5, 6, 8, 10, 20, 30, 40, 50, 60, 80, 100, 200} ms. The DRX cycle start offset (i.e. when Active Time is considered to begin) can be set between 0 and one less than the DRX cycle length, inclusive. (Refer to the MAC-MainConfig information element in Section 6.3.2 of 36.331.)

The following discussion relates to techniques for sharing spectrum between cellular communications such as EUTRA communications and broadcast physical frames such as ATSC 3.0 frames.

Example Spectrum Sharing Techniques with Time Spacing between Consecutive Broadcast Frames In some embodiments, the disclosed techniques facilitate dynamic sharing of spectrum between multiple Radio Access Technologies (RATs). In various embodiments of dynamic sharing, each of the sharing RATs is able to transmit often enough (e.g. at least once every several seconds, and more preferably once or more per second) to support near real-time operation. Near real-time operation implies that many applications such as video or audio broadcast, web browsing, email, streaming, file downloads, etc, can be supported in a manner that is transparent to the end user(s), but applications requiring real-time bi-directional communications (e.g. voice conversations) may not operate in a sufficiently satisfactory manner for the end user(s).

The shared RF spectrum referred to by this disclosure may originate from any of the participating RATs. For example, the RF spectrum may originally have been allocated for ATSC 3.0 use, but may then be shared dynamically between ATSC 3.0 and EUTRA transmissions for a certain period of time (or possibly for an indefinite period of time) before eventually reverting back to full-time ATSC 3.0 transmissions. Similarly, the RF spectrum may originally have been allocated for EUTRA use, but is then shared dynamically between EUTRA and ATSC 3.0 transmissions for a certain period of time (or possibly for an indefinite period of time) before eventually reverting back to full-time EUTRA transmissions. The system bandwidths of the ATSC 3.0 and EUTRA transmissions may be the same as each other or may be different. In the latter case, a narrower bandwidth ATSC 3.0 signal may be transmitted in a wider bandwidth EUTRA RF channel allocation, or a narrower bandwidth EUTRA signal may be transmitted in a wider bandwidth ATSC 3.0 RF channel allocation. Further, the shared spectrum may be used to augment other spectrum allocated to a particular RAT, e.g., using carrier aggregation or channel bonding.

Each of the multi-RAT transmissions originates from a transmitter capable of transmitting waveforms according to the corresponding RAT. Multi-RAT transmissions may originate from distinct transmitters (e.g. separate ATSC 3.0 and EUTRA transmitters) and/or the same transmitter (e.g. a transmitter capable of transmitting both ATSC 3.0 and EUTRA waveforms). In the event of separate transmitters, these transmitters may be co-located or may be positioned at different geographic locations.

Similarly, receivers in the context of this disclosure may receive signals from one or more of the RATs associated with the transmitted waveforms. For example, a receiver may receive only the ATSC 3.0 portion of the transmitted signal, only the EUTRA portion of the transmitted signal, or both the ATSC 3.0 and EUTRA portions of the transmitted signal.

In some embodiments, consecutive ATSC 3.0 physical layer frames are transmitted with gaps in time between frames. As discussed above, the min_time_to_next signaling field in the bootstrap indicates a time window where the next bootstrap of the same version is located, but there is no stated requirement as to exactly where that next bootstrap will appear within the time window, nor is there a requirement that the time window be positioned such that it includes the end of the current physical layer frame.

Figure 15A:
FIGS. 15A-15B are diagrams illustrating example gaps between broadcast frames, according to some embodiments.
Figure 15B:

FIG. 15A shows an example of a sequence of ATSC 3.0 physical layer frames with a relatively smaller time gap between successive frames, while FIG. 15B shows an example of a sequence of ATSC 3.0 physical layer frames with a relatively larger time gap between successive frames.

With a carefully constructed broadcast schedule of programs and corresponding physical layer configuration, the data (e.g. video, audio, captions, etc) being broadcast can be encoded and packed into time-separated physical layer frames such as those shown in FIG. 15A and FIG. 15B. Receivers, in some embodiments, are configured to buffer the decoded data and play the data out according to designated time points in order to provide the appearance of continuous playback to the end user, despite the time discontinuities in the ATSC 3.0 transmitted waveform. This may advantageously provide playback while allowing spectrum sharing with another RAT between frames.

Figure 16:
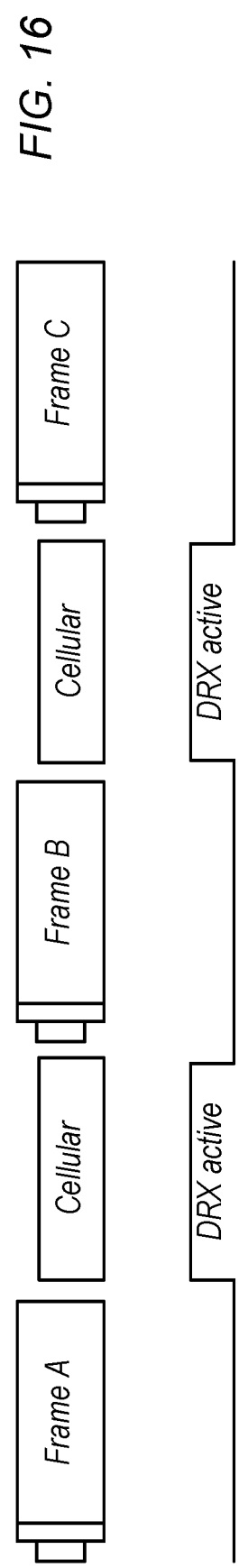
FIG. 16 is a diagram illustrating example spectrum sharing for cellular communications between broadcast frames.

For example, FIG. 16 shows a technique in which cellular transmissions can occur (e.g., during DRX active intervals) between each broadcast frame in a set of frames (three frames, in the illustrated example). In this example, the ATSC 3.0 transmissions may occupy a system bandwidth of 6 MHz (as is the case for North America), with the EUTRA transmissions occupying a bandwidth of 5 MHz. The EUTRA transmissions may represent a Time Division Duplexing (TDD) system or either the downlink or uplink of a Frequency Division Duplexing (FDD) system.

FIG. 16 shows individual single consecutive ATSC 3.0 physical layer frames separated by a time gap, into which is inserted an EUTRA transmission. Note that this diagram is exemplary only, and there may be multiple contiguous ATSC 3.0 frames being transmitted before a time gap occurs, in some embodiments. For example, gaps may be scheduled between sets of two broadcast frames that are contiguous or between sets of three broadcast frames that are contiguous, in some situations, while still maintaining near-real-time shared-spectrum communications. In some embodiments, gaps may be scheduled between sets of contiguous broadcast frames having different sizes (e.g., with a gap, then a single broadcast frame, gap, two contiguous broadcast frames, gap, a single broadcast frame, etc.). Also, gap intervals of various lengths between broadcast frames may be scheduled at different points in a sequence of frames.

The illustrative EUTRA transmissions shown in FIG. 16 may be managed by configuring all active UEs in the EUTRA cell with identical or similar DRX cycles. As shown in the diagram, the EUTRA UEs are configured to wake up from DRX (and enter DRX Active Time) at the beginning of a time gap between successive ATSC 3.0 frames and to enter DRX at the end of that same time gap. In this manner, the EUTRA UEs should not expect to receive EUTRA transmissions during the time period in which ATSC 3.0 frames are transmitted.

One exemplary DRX configuration sets the DRX cycle length to 256 ms and the DRX On Duration Timer to 100 ms. By appropriately setting the DRX cycle start offset (e.g. to 153) and using a time-aligned ATSC 3.0 physical layer frame with a length of 150 ms, the exemplary time-division multiplexing of ATSC 3.0 and EUTRA transmissions as shown in the following table may be achieved. The use of a time-aligned ATSC 3.0 frame here is not mandatory; for example, a symbol-aligned ATSC 3.0 frame of the appropriate length may be used instead.

| Relative Time Period | Transmission Activity |
| --- | --- |
| 0-150 ms | ATSC 3.0 physical layer frame |
| 150-153 ms | Guard period between ATSC 3.0 and EUTRA |
| 153-253 ms | EUTRA transmissions |
| 253-256 ms | Guard period between EUTRA and ATSC 3.0 |
| 256+ ms | Transmission cycle repeats |

Traditionally, an EUTRA base station regularly and/or periodically transmits at least the following signals and physical channels on the downlink: Primary Synchronization Signal (PSS), Secondary Synchronization Signal (SSS), Physical Control Format Indicator CHannel (PCFICH), Physical Hybrid-ARQ Indicator CHannel (PHICH), Physical Downlink Control CHannel (PDCCH), Cell-specific Reference Signals (CRS), and Positioning Reference Signals (PRS). Traditionally the above transmissions would continue during DRX non-Active Time for one or more UEs during normal EUTRA operation.

The following discussion provides techniques for handling the above signals and physical channels when different RATs are time-division multiplexed into the same RF channel. In some embodiments, the EUTRA base station continues to transmit its regularly-transmitted signals and physical channels as required during the time period in which ATSC 3.0 transmissions occur. If the relative transmit power of the ATSC 3.0 transmitter is significantly larger than the transmit power of the EUTRA base station, then the EUTRA transmissions would appear as a small amount of interference to the ATSC 3.0 transmissions, which may be negated by selection of a sufficiently robust ATSC 3.0 configuration. Any EUTRA UEs that happen to be active may be able to detect those EUTRA transmissions, despite the presence of an interfering ATSC 3.0 transmission.

In other embodiments, the EUTRA base station suspends all transmissions, including any regularly-transmitted signals and physical channels during the time period in which ATSC 3.0 transmissions occur. In this manner, no interference occurs to the active ATSC 3.0 transmissions.

In order to enable UEs to make use of an EUTRA carrier time-division multiplexed with ATSC 3.0 transmissions, there should be some feasible method that allows a UE to connect to that carrier, bearing in mind that during multiplexed operation the EUTRA carrier will be available only part of the time. The following discussion assumes that the EUTRA transmissions which are time-division multiplexed with the ATSC 3.0 transmissions represent either a TDD system or the downlink of an FDD system.

Note that Table 11.2-1 in Section 11.2 of 36.331 specifies the expected time to complete a number of different RRC procedures in EUTRA, ignoring any delays caused by a random access procedure. Generally, RRC connection reconfigurations (including a handover within EUTRA) are expected to be completed within 15-20 ms, with a random access procedure possibly requiring another 20-40 ms depending upon the system configuration related to supporting random access.

An EUTRA cell broadcasts system information, which provides parameters and other data about that cell's configuration, which in turn allows a UE to connect to that cell. For example, there are a number of System Information Blocks (SIBS) whose contents should be known by a UE before connecting to the corresponding cell. The Master Information Block (MIB) provides information required for a UE to acquire System Information Block 1 (SIB1). The MIB has a fixed broadcast schedule with a 40 ms periodicity and different redundancy versions of the MIB being broadcast every 10 ms within that 40 ms period. SIB1 contains scheduling information about the broadcast schedule of the remaining System Information Blocks, as well as other parameter values. SIB1 has a fixed broadcast schedule with an 80 ms periodicity and different redundancy versions of SIB1 being broadcast every 20 ms within that 80 ms period. SIB2 contains the remaining information required by a UE moving to or already in the RRC CONNECTED state. SIB2 has a configurable broadcast schedule which is signaled in SIB1.

In some embodiments, a time-division multiplexed cellular cell is configured to either broadcast the relevant System Information Blocks only during DRX Active Time. In some embodiments, the cell is configured to broadcast that data regularly according to the required schedule, regardless of whether DRX Active Time is in effect or not. In the latter case, system information transmissions during ATSC 3.0 transmissions may appear as interference to the ATSC 3.0 transmission.

In some embodiments, a cellular network is configured to schedule system information such as SIB2 such that it appears early in the DRX Active Time period, in order to allow UEs to quickly acquire SIB2. This may allow UEs to connect within the interval between broadcast frames, for example. Note, in the EUTRA example however, that a UE may first need to acquire the MIB and then SIB1 before acquiring SIB2, so system information scheduling should take this into account to ensure that UEs have sufficient time to acquire those three information blocks sequentially within the same DRX Active Time period.

In some embodiments, the network is configured to set the system information modification period to a large value (e.g., by configuring larger values for modificationPeriodCoeff and defaultPagingCycle (see the RadioResourceConfigCommon information element in Section 6.3.2 of 36.331)) to increase the amount of time over which acquired system information can be considered to remain valid.

In some embodiments, a UE may acquire the system information of the time-division multiplexed EUTRA carrier during one DRX Active Time period before initiating a connection to the EUTRA base station in the next DRX Active Time period, depending upon the actual time length of the DRX Active Time period.

When an EUTRA UE attempts to connect to a cell, a certain amount of time is required in order to perform tasks such as a random access procedure (which may require multiple attempts at transmitting a random access preamble), requesting a connection from the controlling base station, receiving configuration information from the base station, etc. In some embodiments, a sufficient amount of time is provided between consecutive ATSC 3.0 frames so that all of these tasks can be performed within the same DRX Active Time period. In this sense, the time-division multiplexing arrangement illustrated in FIG. 15B may be preferable to that illustrated in FIG. 15A, since the former provides a longer continuous time period during which EUTRA is active.

Depending upon when a UE begins transmitting random access preambles to initiate a connection, that UE may not be able to receive a random access response for a while if an ATSC 3.0 frame is being transmitted. Therefore, in some embodiments, a parameter for the maximum allowable number of random access preamble transmission attempts (before a UE determines that a random access procedure has failed) is set to a large value. This may allow a UE to begin a random access procedure towards the end of a first DRX Active Time period, continue transmitting random access preambles during the non-Active Time period (during which time the ATSC 3.0 transmission is active and the UE will consequently not receive a random access response), and then successfully complete the random access procedure during the following DRX Active Time period.

Additionally, the EUTRA base station may endeavor to provide random access responses as quickly as possible when detecting a random access preamble that is determined to be potentially affected by time division multiplexing in order to minimize turn-around time during random access procedures.

Figure 17:
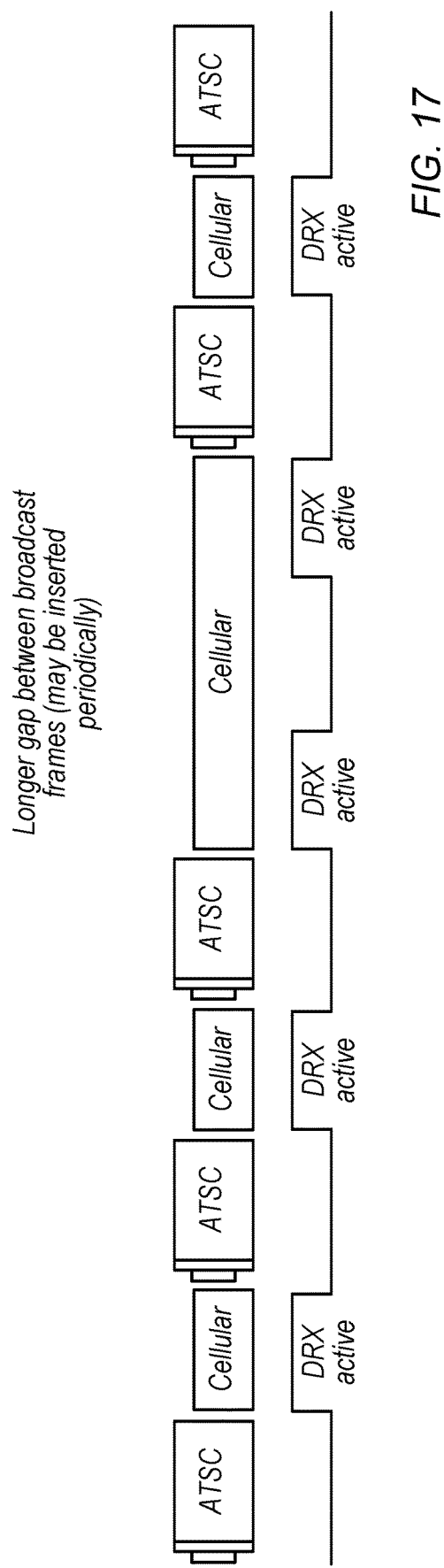
FIG. 17 is a diagram illustrating an example of a longer gap between certain broadcast frames, according to some embodiments.

In some embodiments, a larger time gap is periodically inserted between two successive ATSC 3.0 frames in order to allow more time for UEs to connect to the EUTRA cell during that longer time period. This concept is illustrated in the example of FIG. 17. As can be seen, one of the regularly-spaced ATSC 3.0 frame intervals has been omitted, thereby allowing the preceding EUTRA transmission to extend over a time period equal in length to two DRX Active Time periods and one ATSC 3.0 frame. This provides a longer time opportunity for UEs to connect to the EUTRA base station during that interval. Such intervals may be inserted periodically or according to some other schedule.

In some embodiments, if a UE first connects to another EUTRA cell (the source cell), or even a non-EUTRA cell, and is then handed over to the EUTRA carrier that is time-division multiplexed with the ATSC 3.0 transmissions (referred to here as the TDM carrier), then this may reduce the time required for the UE to connect to the TDM carrier. The UE will already be in the RRC CONNECTED state after connecting to the first EUTRA cell, which eliminates the need to request an RRC connection with the TDM carrier. Additionally, the system information of the TDM carrier can be supplied to the UE as part of the handover message, which eliminates the need to acquire system information from the TDM carrier before connecting to it (although the system information of the TDM carrier still needs to be verified by the UE after completing the handover).

If a handover from a different EUTRA cell is performed to get the UE onto the TDM carrier, then the source cell, in some embodiments, is configured to appropriately time the transmission of the handover message to the UE such that the UE begins its connection to the TDM carrier at the beginning of DRX Active Time for that carrier, thereby advantageously increasing the amount of time that is available for completing the handover before DRX Active Time is over.

The above techniques for facilitating a UE to connect to an EUTRA carrier which is time-division multiplexed with ATSC 3.0 transmissions may work with minimal or no changes required to the EUTRA specification. However, it may be useful for such UEs to be aware that EUTRA operations are time-division multiplexed with other wireless transmissions and hence the EUTRA signals will essentially disappear during periodic intervals. It may be necessary to include this within the EUTRA specification. Alternatively, it may be possible to design or modify UEs that can recognize this mode of operation and react to it accordingly. This is especially possible for dual-mode UEs that might receive both ATSC 3.0 and EUTRA transmissions which have been time-division multiplexed together within the same RF channel. Such UEs, in some embodiments, are configured to receive a constant stream of RF samples for a common system bandwidth (representing the maximum of the configured ATSC 3.0 and EUTRA system bandwidths) and then process those RF samples accordingly depending upon whether the current time period represents an ATSC 3.0 or EUTRA transmission.

In some embodiments, the UE may operate with multiple component carriers in the downlink direction. That is, the UE is able to simultaneously receive data on two or more EUTRA carriers, with each carrier being located within a separate frequency band. In such a multi-carrier configuration, the UE may receive control signaling (e.g. on the PDCCH) on one carrier, with that control signaling indicating relevant downlink transmissions for the UE on any of the multiple carriers that have been configured for that UE. The carrier that carries control signaling for the UE may be referred to as PCell (Primary Cell), and any supplemental carriers that have also been configured for the UE may be referred to as SCell (Secondary Cell).

The UE may first connect to a non-time-division-multiplexed EUTRA carrier in a first frequency band, which is then configured as that UE's PCell. The UE may then be additionally configured with a supplemental time-division-multiplexed EUTRA carrier as SCell in a second frequency band. In some embodiments, the base station may schedule SCell transmissions to the UE on the TDM SCell carrier only during time periods when ATSC 3.0 transmissions do not occur. In some embodiments, the base station may schedule PCell transmissions to the UE, but not SCell transmissions, during time periods when ATSC 3.0 transmissions occur. In some embodiments, the UE may be configured to enter DRX on the SCell carrier and/or the PCell carrier during time periods when ATSC 3.0 transmissions occur.

In the ideal case of the example ATSC 3.0 transmissions shown in FIG. 15A and FIG. 15B, it can be seen that the RF power in the transmitted signal will abruptly rise from zero to full power at the beginning of a physical layer frame, and will similarly abruptly drop from full power to zero at the end of a physical layer frame.

In practice, any such abrupt change in transmission power may cause unwanted spurious RF emissions which may cause interference to other wireless signals. This is especially true for large high-power ATSC 3.0 transmitters where a significant amount of power is present in the transmitted waveform. In these high-power situations, the RF components of the transmitter may in fact be damaged if such sudden fluctuations in the RF power are present. The following discussion presents at least two solutions to this issue.

Figure 18:
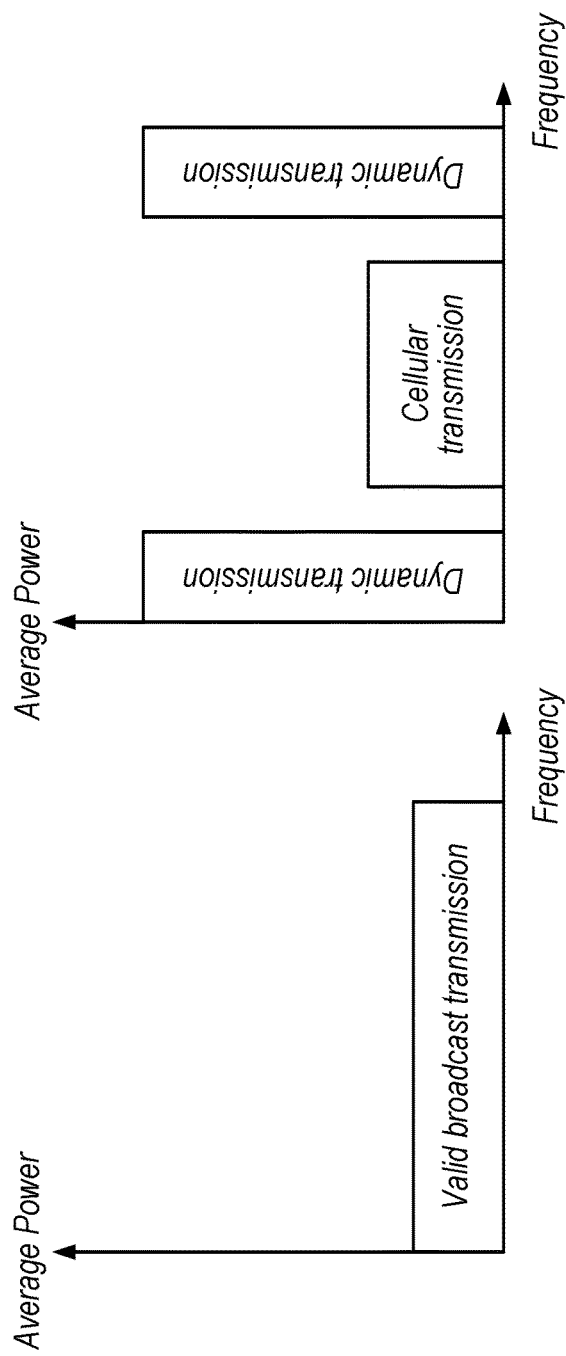
FIG. 18 is a diagram illustrating example power shifting to non-interfering frequencies, according to some embodiments.

In a high-powered ATSC 3.0 transmitter, it may not be possible to switch off the RF transmission power during time intervals when ATSC 3.0 physical layer frames are not expected to be present. However, in some embodiments, the transmitter is configured to direct the RF power only to certain portions of the frequency spectrum, thereby leaving the remainder of the available frequency spectrum to be occupied by the cellular transmission. In this manner, the signal from the ATSC 3.0 transmitter may appear as frequency-specific interference to the EUTRA transmitter, with the latter transmitter configured to schedule its transmissions in the portions of the spectrum that were unoccupied (or temporarily vacated) by the ATSC 3.0 transmitter. Normally, the average power distribution across the frequency spectrum of an ATSC 3.0 waveform would appear to be essentially constant as shown in the left-hand side of FIG. 18. During time periods when EUTRA transmissions were scheduled, the broadcast power from the ATSC 3.0 transmitter could be directed to the band edges of the available spectrum with the EUTRA transmitter making use of the central part of the frequency band as shown in the right-hand side of FIG. 18. This ATSC 3.0 transmission in FIG. 18 may not be a valid ATSC 3.0 transmission, but may instead represent the transmission of dummy data on OFDM carriers belonging to the corresponding frequency intervals. A frequency gap or frequency guard interval may be present between the dummy ATSC 3.0 transmission(s) and the EUTRA transmission in order to mitigate any adjacent channel interference to the EUTRA transmission. Note that FIG. 18 is simply an example and that the ATSC transmitter may direct its broadcast power to other portions of the available spectrum. This may be accomplished in an OFDM-based system such as ATSC 3.0 (and EUTRA) by modulating the OFDM carriers in part(s) of the spectrum with greater-than-normal power while not modulating (i.e. applying a null, zero, or significantly reduced power) the OFDM carriers in the other part(s) of the spectrum reserved for EUTRA operation.

Figure 19:
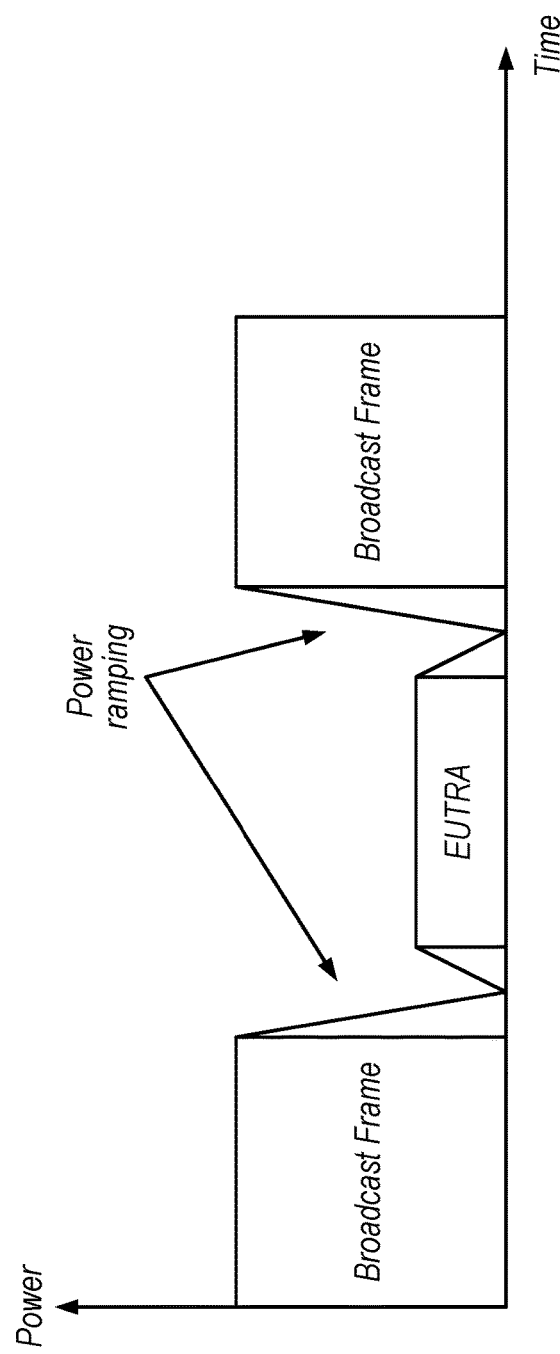
FIG. 19 is a diagram illustrating example guard intervals and power ramping, according to some embodiments Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

In other embodiments, a transmitter (e.g., a lower-powered local ATSC 3.0 transmitter) may be able to switch off its RF transmission power without damaging the RF circuitry and other RF components. However, this may use a small but non-zero amount of time in order to go from full power to zero, and vice versa. Consequently, a small time gap or guard interval to allow for this transition may be left between the end of an ATSC 3.0 frame and the beginning of an EUTRA transmission. A similar guard period may be positioned between the end of an EUTRA transmission and the beginning of an ATSC 3.0 frame. This guard period may prevent possible mutual interference between an ATSC 3.0 transmission and an EUTRA transmission which have been time-division multiplexed into the same RF spectrum. This is illustrated in FIG. 19. In addition, when those two transmissions originate from different transmitters and/or from different geographic locations, a guard period will also mitigate any mutual interference that might occur due to any possible offset in time synchronization between the different transmitters.

In FIG. 19, the ramping of ATSC 3.0 and EUTRA transmit powers is shown as non-overlapping. This is exemplary only, and the ramp-down and ramp-up periods for the different transmission may or may not overlap in time. Note also that the time durations shown in FIG. 19 (and various illustrations herein) are not necessarily to scale and have been exaggerated in certain instances for illustrative purposes.

EUTRA base stations are generally expected to have lower transmit power than will high-power ATSC 3.0 transmitters and should thus have fewer issues with turning their RF power on and off. In particular, such dynamic transmit power on/off functionality is already present in EUTRA functionalities such as TDD operation (e.g. Section 4.2 of 36.211), MBSFN subframes where PMCH and MBSFN reference signals are not transmitted in the MB SFN region of MB SFN subframes (Sections 6.1 and 6.10.2 of 36.211), and Almost Blank Subframes (Section 16.1.5 of 36.300). Switching on and off of RF power at a EUTRA base station may be handled accordingly.

Embodiments described in this disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE, a broadcast receiver, or a base station) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The processor may be a central processing unit (CPU) or a digital signal processor (DSP), for example. The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
wirelessly broadcasting, by a broadcast base station, a common set of audio and video data to a plurality of broadcast receiver devices using a particular frequency band, wherein the broadcast base station is not configured to receive content data from any of the broadcast receiver devices;
aligning, by the broadcast base station, a broadcast frame boundary with a boundary for frames transmitted by one or more cellular base stations, wherein the alignment of the frames enables the one or more cellular base stations to transmit cellular control signaling using resources of a preamble interval of the broadcast frame;
discontinuing broadcasting, by the broadcast base station, in the particular frequency band during a scheduled time interval, to enable at least one cellular base station to perform bi-directional packet-switched wireless data communications using the particular frequency band; and
resuming broadcasting, by the broadcast base station, in the particular frequency band after the scheduled time interval.

2. The method of claim 1, further comprising:
transmitting, by the broadcast base station, control signaling during a pre-determined portion of the scheduled time interval, wherein the control signaling includes synchronization information to enable one or more broadcast receiver devices to remain connected to the broadcast base station during the scheduled time interval such that the receiver devices remain synchronized with the broadcast base station at the end of the scheduled time interval.

3. The method of claim 1, wherein the discontinuing is based on receiving information indicating that one or more cellular base stations will utilize the particular frequency band during the scheduled time interval.

4. The method of claim 1, wherein the scheduled time interval corresponds to a portion of a frame of bi-directional packet-switched wireless data communications data transmitted by the at least one cellular base station.

5. The method of claim 4, wherein the broadcast base station is configured to wirelessly broadcast audio and video data during a second portion of the frame of bi-directional packet-switched wireless data.

6. The method of claim 5, wherein the second portion of the frame corresponds to a multicast/broadcast single frequency network (MBSFN) subframe.

7. The method of claim 1, further comprising:
transmitting, by the broadcast base station, blanking information indicating the scheduled time interval to receiving devices of the broadcast audio and video data.

8. The method of claim 1, wherein the packet-switched wireless data communications are Long Term Evolution (LTE) communications.

9. A method, comprising:
performing, by a cellular base station, bi-directional packet-switched communication with one or more mobile devices using a first frequency band;
aligning, by the cellular base station, a cellular frame boundary with a broadcast frame boundary for a frame transmitted by a broadcast base station;
transmitting, by the cellular base station, control signaling using resources of a preamble interval of the broadcast frame based on the aligning; and
performing, by the cellular base station, bi-directional packet-switched communication with one or more mobile devices using a second frequency band during a scheduled time interval, wherein the second frequency band is used for wirelessly broadcasting a common set of audio and video data to a plurality of devices, by the broadcast base station, during a first time interval prior to the scheduled time interval and a second time interval subsequent to the scheduled time interval.

10. The method of claim 9, further comprising:
wherein the control signaling includes synchronization information for the second frequency band outside of the scheduled time interval to enable one or more cellular devices to remain synchronized with and connected to the cellular base station outside of the scheduled time interval.

11. The method of claim 9, wherein the scheduled time interval corresponds to a subframe of bi-directional packet-switched wireless data communication.

12. The method of claim 9, wherein the scheduled time interval is based on information received from a broadcast system.

13. The method of claim 9, wherein the broadcast base station transmits using the second frequency band during a multicast/broadcast single frequency network (MBSFN) subframe of a cellular frame.

14. An apparatus for a broadcast base station, comprising, comprising:
one or more processors configured to:
wirelessly broadcast a common set of audio and video data to a plurality of broadcast receiver devices using a particular frequency band, wherein the broadcast base station is not configured to receive content data from any of the broadcast receiver devices;
align a broadcast frame boundary with a boundary for frames transmitted by one or more cellular base stations, wherein the alignment enables the one or more cellular base stations to transmit cellular control signaling using resources of a preamble interval of the broadcast frame;
discontinue broadcasting in the particular frequency band during a scheduled time interval, to enable at least one cellular base station to perform bi-directional packet-switched wireless data communications using the particular frequency band; and
resume broadcasting in the particular frequency band after the scheduled time interval.

15. The apparatus of claim 14, wherein the one or more processors are further configured to:
transmit control signaling during a pre-determined portion of the scheduled time interval, wherein the control signaling includes synchronization information to enable one or more broadcast receiver devices to remain connected to the broadcast base station during the scheduled time interval such that the receiver devices remain synchronized with the broadcast base station at the end of the scheduled time interval.

16. The apparatus of claim 14, wherein the discontinuation is based on receiving information indicating that one or more cellular base stations will utilize the particular frequency band during the scheduled time interval.

17. The apparatus of claim 14, wherein the scheduled time interval corresponds to a portion of a frame of bi-directional packet-switched wireless data communications data transmitted by the at least one cellular base station.

18. The apparatus of claim 17, wherein the broadcast base station is configured to wirelessly broadcast audio and video data during a second portion of the frame of bi-directional packet-switched wireless data.

19. The apparatus of claim 18, wherein the second portion of the frame corresponds to a multicast/broadcast single frequency network (MBSFN) subframe.

20. The apparatus of claim 14, wherein the one or more processors are further configured to:
transmit blanking information indicating the scheduled time interval to receiving devices of the broadcast audio and video data.

* * * * *